US009363839B2

(12) United States Patent
Zhao et al.

(10) Patent No.: US 9,363,839 B2
(45) Date of Patent: Jun. 7, 2016

(54) METHOD FOR ESTABLISHING BEARER FOR MACHINE TO MACHINE SERVICE AND NETWORK TRANSMISSION DEVICE

(75) Inventors: Yang Zhao, Shanghai (CN); Jun Qin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 13/570,752

(22) Filed: Aug. 9, 2012

(65) Prior Publication Data

US 2012/0307764 A1 Dec. 6, 2012

Related U.S. Application Data

(63) Continuation of application No. PCT/CN2011/070907, filed on Feb. 10, 2011.

(30) Foreign Application Priority Data

Feb. 11, 2010 (CN) .......................... 2010 1 0111624

(51) Int. Cl.
*H04W 4/00* (2009.01)
*H04W 76/02* (2009.01)
*H04W 28/24* (2009.01)
*H04W 8/18* (2009.01)

(52) U.S. Cl.
CPC ............ *H04W 76/022* (2013.01); *H04W 4/005* (2013.01); *H04W 8/186* (2013.01); *H04W 28/24* (2013.01)

(58) Field of Classification Search
None
See application file for complete search history.

(56) References Cited

U.S. PATENT DOCUMENTS

| 7,440,744 | B2 * | 10/2008 | Muniere et al. ................ 455/403 |
| 7,613,147 | B2 * | 11/2009 | Bergenlid et al. .............. 370/329 |
| 7,680,109 | B2 * | 3/2010 | Lundin ................. H04L 12/189 370/348 |
| 7,792,935 | B2 * | 9/2010 | Karjanlahti .................... 709/223 |
| 8,638,713 | B2 * | 1/2014 | Shen et al. ..................... 370/328 |

(Continued)

FOREIGN PATENT DOCUMENTS

| CN | 1812355 A | 8/2006 |
| CN | 101047981 A | 10/2007 |

(Continued)

OTHER PUBLICATIONS

International Search Report, mailed May 19, 2011, in corresponding International Application No. PCT/CN2011/070907 (8 pp.).

(Continued)

*Primary Examiner* — Kibrom T Hailu
(74) *Attorney, Agent, or Firm* — Staas & Halsey LLP

(57) ABSTRACT

Embodiments of the present invention relate to a method for establishing a bearer for a machine to machine service and a network transmission device, where the method includes: receiving a user plane resource establishment request message sent by an MTC device, where the user plane resource establishment request message includes at least one of MTC features, QoS requirements, a service indication request and a group identity; determining negotiated QoS parameters according to the user plane resource establishment request message; and establishing a transmission bearer with the MTC device according to the negotiated QoS parameters. The present invention provides a method for establishing a transmission bearer between a network and an MTC device.

16 Claims, 11 Drawing Sheets

(56) References Cited

U.S. PATENT DOCUMENTS

| | | | | |
|---|---|---|---|---|
| 2003/0182926 | A1* | 10/2003 | Plona | F01D 21/045 60/226.1 |
| 2003/0221016 | A1* | 11/2003 | Jouppi et al. | 709/245 |
| 2004/0057412 | A1* | 3/2004 | Curcio et al. | 370/341 |
| 2004/0087320 | A1* | 5/2004 | Kim | H04H 20/16 455/458 |
| 2004/0125770 | A1* | 7/2004 | Pitt et al. | 370/331 |
| 2004/0233907 | A1* | 11/2004 | Hundscheidt | H04L 12/185 370/390 |
| 2004/0246984 | A1* | 12/2004 | Hundscheidt | H04L 12/185 370/432 |
| 2005/0018678 | A1* | 1/2005 | Keller | H04L 12/189 370/390 |
| 2005/0025180 | A1* | 2/2005 | Curcio et al. | 370/468 |
| 2006/0104225 | A1* | 5/2006 | Kim | H04L 12/189 370/313 |
| 2006/0262723 | A1* | 11/2006 | Velev et al. | 370/235 |
| 2007/0183372 | A1* | 8/2007 | Janko | H04W 84/08 370/335 |
| 2007/0258427 | A1* | 11/2007 | Shaheen et al. | 370/338 |
| 2008/0013470 | A1* | 1/2008 | Kopplin | H04L 12/5695 370/310 |
| 2008/0013553 | A1* | 1/2008 | Shaheen | 370/401 |
| 2008/0068995 | A1* | 3/2008 | Skog | 370/230.1 |
| 2008/0232292 | A1* | 9/2008 | Zhang | H04W 76/002 370/312 |
| 2008/0259865 | A1* | 10/2008 | Hurtta et al. | 370/329 |
| 2009/0149177 | A1 | 6/2009 | Machida et al. | |
| 2009/0197585 | A1* | 8/2009 | Aaron | 455/418 |
| 2010/0220665 | A1* | 9/2010 | Govindan et al. | 370/329 |
| 2011/0191826 | A1* | 8/2011 | Ballal | H04L 63/104 726/4 |

FOREIGN PATENT DOCUMENTS

| | | |
|---|---|---|
| CN | 101465860 A | 6/2009 |
| CN | 101895858 A | 11/2010 |
| CN | 102026372 A | 4/2011 |
| WO | WO 2009/024050 A1 | 2/2009 |

OTHER PUBLICATIONS

International Search Report mailed May 19, 2011 for corresponding International Application No. PCT/CN2011/070907.

Written Opinion of the International Searching Authority mailed May 19, 2011 for corresponding International Application No. PCT/CN2011/070907.

Sierra Wireless, "Proposed Minor Corrections and Definitions to NIMTC TS", S1-091118, 3GPP TSG-SA1 #46, May 11-15, 2009, 6 pp.

Nokia Siemens Networks, Contribution to TS 22.368—Indicating main work focus of Rel-10 NIMTC, S1-094344, 3GPP TSG-SA1 #48, Nov. 16-20, 2009, 2 pp.

Huawei, HiSilicon, "MTC indicator at connection setup", R2-106296, 3GPP TSG-RAN WG2 Meeting #72, Nov. 15-19, 2010, 3 pp.

M2M, "Design and Implementation of M2M Solution", Oct. 25, 2007, <http://cnki.net>, pp. 1-60.

Chinese Office Action dated Nov. 4, 2015 in corresponding Chinese Patent Application No. 201010111624.2.

"3rd Generation Partnership Project; Technical Specification Group Services and System Aspects; Service requirements for machine-type communications; Stage 1 (Release 10)", 3GPP TS 22.368, V1.1.1, Nov. 2009, pp. 1-23.

\* cited by examiner

METHOD FOR ESTABLISHING BEARER FOR MACHINE TO MACHINE SERVICE AND NETWORK TRANSMISSION DEVICE

CROSS-REFERENCE TO RELATED APPLICATIONS

This application is a continuation of International Application No. PCT/CN2011/070907, filed on Feb. 10, 2011, which claims priority to Chinese Patent Application No. 201010111624.2, filed on Feb. 11, 2010, both of which are hereby incorporated by reference in their entireties.

FIELD OF THE INVENTION

Embodiments of the present invention relate to the field of communications technologies, and in particular, to a method for establishing a bearer for a machine to machine service, a communication method for a machine to machine service, a network transmission device and a machine type communication server.

BACKGROUND OF THE INVENTION

"Machine" to "machine" (Machine to Machine, M2M for short) communication refers to connecting various ubiquitous end devices or subsystems by types of communications technologies and converging these end devices or subsystems to a management system to implement management and serving for the devices. For example, a module capable of monitoring operation parameters of a power distribution network is installed in an electric power device, for implementing real-time monitoring, control, management and maintenance for the power distribution system. A module capable of collecting information about the operation of an oil well is installed in an oil device, for remotely adjusting and controlling an oil well device and knowing information about the operation of the oil well device in time and accurately. A terminal for collecting in-vehicle information and a remote monitoring system are installed in a vehicle, for monitoring the operation state of the vehicle. With the deepening of relevant technologies including communication devices and management software, the range of M2M services gradually expands.

M2M applications require mass deployment of machine type communication (Machine Type Communication, MTC for short) terminals within a certain area, and multiple MTC terminals may be directly connected to a mobile communication network, or may be firstly connected to an MTC gateway (GateWay, GW for short) before accessing the mobile communication network. In these two cases, the M2M applications continue to use the conventional GSM/GPRS architecture. If the process of initiating a service in the conventional GSM/GPRS architecture is followed, the mobile communication network needs to identify each terminal. Because the number of MTC terminals is large, the identification may cause excessive signaling overhead, and accordingly, each network node also must store a large amount of terminal information accordingly. Therefore, in the M2M applications, the MTC terminals that directly access the mobile communication network or access the mobile communication network by using the MTC GW may be invisible to the mobile communication network. That is, the mobile communication network does not know which MTC terminal communicates with the mobile communication network. In this case, how to establish a transmission bearer between a terminal side and a network side and further initiate a service process correctly is a problem to be solved currently.

SUMMARY OF THE INVENTION

Embodiments of the present invention provide a method for establishing a bearer for a machine to machine service, a communication method for a machine to machine service, a network transmission device and a machine type communication server.

A method for establishing a bearer for a machine to machine service according to an embodiment of the present invention includes:

receiving a user plane resource establishment request message sent by an MTC device, where the user plane resource establishment request message includes at least one of MTC features, quality of service (QoS) requirements, a service indication request and a group identity, and the QoS requirements are obtained by the MTC device according to the MTC features;

determining negotiated QoS parameters according to the user plane resource establishment request message; and establishing a transmission bearer with the MTC device according to the negotiated QoS parameters.

A communication method for a machine to machine service according to an embodiment of the present invention includes:

receiving, by a network transmission device, a protocol data unit (PDU) data packet, where the PDU data packet includes auxiliary information, and notifying, by the network transmission device, the auxiliary information to an MTC device, where the auxiliary information is used for instructing the MTC device to perform service communication when the MTC device judges that service trigger conditions included in the auxiliary information are satisfied.

A network transmission device according to an embodiment of the present invention includes:

a receiving module, configured to receive a user plane resource establishment request message sent by an MTC device, where the user plane resource establishment request message includes at least one of MTC features, QoS requirements, a service indication request and a group identity;

a negotiating module, configured to determine negotiated QoS parameters according to the user plane resource establishment request message; and an establishing module, configured to establish a transmission bearer with the MTC device according to the negotiated QoS parameters.

A machine type communication server according to an embodiment of the present invention includes:

a sending module, configured to send a PDU data packet to a network transmission device, where the PDU data packet includes auxiliary information so that the network transmission device notifies the auxiliary information to an MTC device, where the auxiliary information is used for instructing the MTC device to perform service communication when the MTC device judges that service trigger conditions included in the auxiliary information are satisfied; and a communicating module, configured to perform service communication with the MTC device when the MTC device judges that the service trigger conditions included in the auxiliary information are satisfied.

Another network transmission device according to an embodiment of the present invention includes:

a receiving module, configured to receive a PDU data packet sent by an MTC server, where the PDU data packet includes auxiliary information; and a notifying module, configured to notify the auxiliary information to an MTC device, where the auxiliary information is used for instructing the MTC device to perform service communication when the MTC device judges that service trigger conditions included in the auxiliary information are satisfied.

According to the method for establishing a bearer for a machine to machine service and the network transmission device provided by the embodiments of the present invention, the user plane resource establishment request message sent by the MTC device includes at least one of the MTC features, the QoS requirements, the service indication request and the group identity; and the network determines the negotiated QoS parameters according to the user plane resource establishment request message, and further establishes the transmission bearer with the MTC device.

According to the communication method for a machine to machine service, another network transmission device and the machine type communication server provided by the embodiments of the present invention, the MTC server sends the PDU data packet including the auxiliary information to the network transmission device so that the network transmission device notifies the auxiliary information to the MTC device, where the auxiliary information includes the service trigger conditions, and when judging that the service trigger conditions are satisfied, the MTC device performs service communication with the network so that the network triggers the MTC device to initiate the service.

BRIEF DESCRIPTION OF THE DRAWINGS

To make the technical solutions of the embodiments of the present invention clearer, the accompanying drawings used in the description of the embodiments are briefly described hereunder. Evidently, the accompanying drawings illustrate only some exemplary embodiments of the present invention and persons of ordinary skill in the art may obtain other drawings based on these drawings without creative efforts.

DETAILED DESCRIPTION OF THE EMBODIMENTS

The technical solutions of the embodiments of the present invention are hereinafter described clearly and completely with reference to the accompanying drawings illustrating the embodiments of the present invention. It is evident that the described embodiments are only some exemplary embodiments of the present invention, rather than all embodiments of the present invention. All other embodiments obtained by persons of ordinary skill in the art without any creative effort based on the embodiments of the present invention fall within the scope of the present invention.

In actual M2M applications, MTC terminals may directly access a mobile communication network, and when the number of MTC terminals is large, the MTC terminals may also access the mobile communication network by using an MTC GW. In some M2M applications, multiple MTC terminals may constitute a group of MTC terminals, a group identity is used for uniquely identifying a group of MTC terminals, and the MTC terminals in the group share common MTC features. In view of the foregoing several applications, the present invention is hereinafter described separately with reference to the following several embodiments.

Assume that before a service is initiated, the MTC terminals and the network have completed a necessary attachment process and/or registration process, and have obtained, in these processes, some necessary parameters required in the process of initiating the service. The processes before initiating the service are not described in the embodiments of the present invention, and if the related parameters required in the process of initiating the service are not described specifically, these parameters are considered to have been obtained in the attachment process or the registration process.

For the convenience of description, if it is mentioned in the following embodiments that a device stores information in a form like A→B, it specifically means that the device stores A and B and stores a mapping relationship between A and B.

The embodiments of the present invention use a global system for mobile communication (GSM) network as an example, but are also applicable to a universal mobile telecommunications system (UMTS) network, with a difference that the access network node of the UMTS is a radio network controller (RNC).

Figure 1:
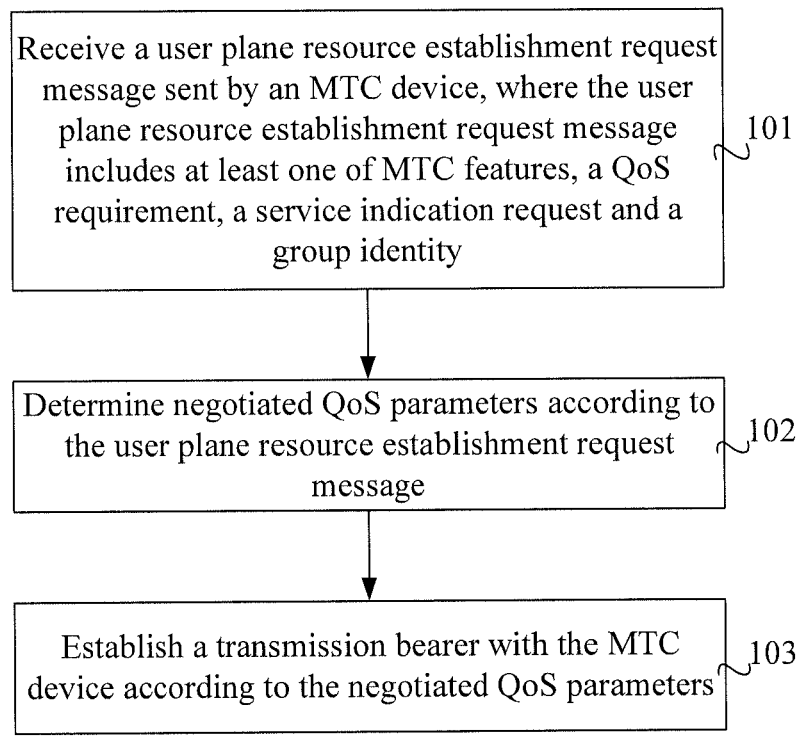
FIG. 1 is a flowchart of a method for establishing a bearer for an M2M service according to a first embodiment of the present invention.

FIG. 1 is a flowchart of a method for establishing a bearer for an M2M service according to a first embodiment of the present invention. As shown in FIG. 1, this embodiment includes the following parts:

101. Receive a user plane resource establishment request message sent by an MTC device, where the user plane resource establishment request message includes at least one of MTC features, QoS requirements, a service indication request and a group identity.

102. Determine negotiated QoS parameters according to the user plane resource establishment request message.

103. Establish a transmission bearer with the MTC device according to the negotiated QoS parameters.

This embodiment provides a method for establishing a bearer for an M2M service, where the user plane resource establishment request message sent by the MTC device includes at least one of the MTC features, the QoS requirements, the service indication request and the group identity; and the network determines the negotiated QoS parameters according to the user plane resource establishment request message, and further establishes a transmission bearer with the MTC device.

Figure 2:
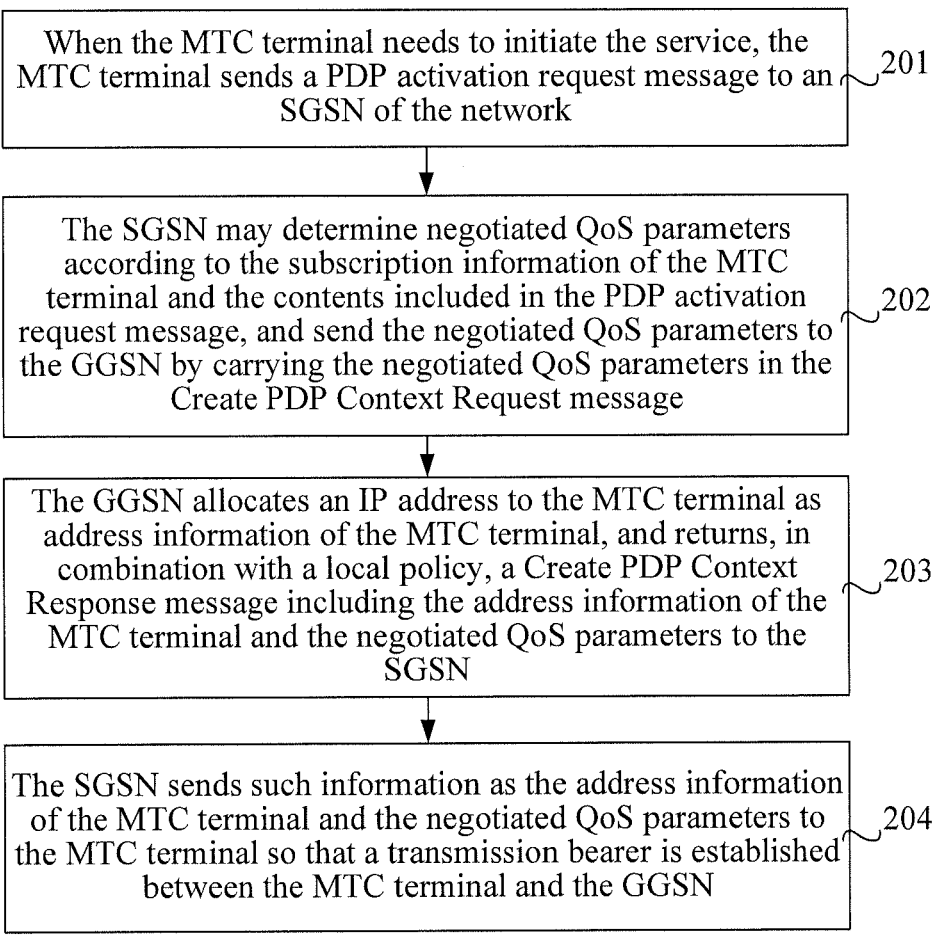
FIG. 2 is a flowchart of a method for establishing a bearer for an M2M service according to a second embodiment of the present invention.

FIG. 2 is a flowchart of a method for establishing a bearer for an M2M service according to a second embodiment of the present invention. This embodiment is directed to the case where an MTC terminal directly accesses a mobile communication network and initiates a service on its initiative, and a user plane resource establishment request message is specifically a packet data protocol (PDP) activation request message.

As shown in FIG. 2, this embodiment includes the following parts:

201. When the MTC terminal needs to initiate the service, the MTC terminal sends a PDP activation request message to a serving GPRS support node (SGSN) of the network. Specifically, the MTC terminal may send the PDP activation request message to the SGSN by a base station system (BSS).

In this embodiment, one MTC terminal may be applied in one or more M2M services so that one MTC terminal may have one or more MTC features (MTC Feature). An MTC feature is a specific service feature. One MTC terminal may simultaneously subscribe for multiple MTC features. For example, if an MTC terminal has two MTC features, namely, low mobility and delay limit, it is indicated that this MTC terminal is a terminal not moving frequently and the service of this MTC terminal has a requirement for delay. The MTC features are a part of subscription information of an MTC terminal, and these MTC features are ultimately reflected in QoS requirements. If one MTC terminal is applied to multiple M2M services, the multiple MTC features subscribed for by the MTC terminal may not satisfy the same QoS requirements simultaneously. Actually, with respect to a specific M2M service, the MTC features may be a subset of a subscription set of the terminal. However, the SGSN stores all activated MTC features subscribed for by the MTC terminal so that the SGSN may not define the QoS requirements accurately.

This embodiment provides the following three ways of dealing with this problem:

1) The MTC terminal judges, according to the currently initiated service, which MTC features need to be satisfied in the subscribed MTC features, and sends these MTC features to be satisfied to the SGSN by carrying these MTC features to be satisfied in the PDP activation request message.

2) The MTC terminal judges, according to the currently initiated service, which MTC features need to be satisfied in the subscribed MTC features, obtains QoS requirements according to these MTC features, and sends the QoS requirements to the SGSN by carrying the QoS requirements in the PDP activation request message.

For example, the MTC terminal may store a mapping table between MTC features and QoS requirements, and the MTC terminal obtains the QoS requirements corresponding to the MTC features by searching the mapping table.

3) The MTC terminal judges, according to the currently initiated service, which MTC features need to be satisfied in the subscribed MTC features, obtains a service indication request according to these MTC features, and sends the service indication request to the SGSN by carrying the service indication request in the PDP activation request message.

For the carrying of the MTC features, a plurality of methods, such as carrying an identity, a description or an index value indicating the MTC features, may be used, and as long as the MTC features can be identified, all these methods fall within the scope of the present invention. The QoS requirements refer to QoS parameters requested by the MTC terminal. The three methods may be used separately or in combination, that is, the PDP activation request message may include at least one of the MTC features, the QoS requirements and the service indication request.

202. The SGSN sends a Create PDP Context Request message to a gateway GPRS support node (GGSN) according to the PDP activation request message, where the SGSN may determine negotiated QoS parameters according to the subscription information of the MTC terminal and the contents (such as at least one of the MTC features, the QoS requirements and the service indication request) included in the PDP activation request message, and send the negotiated QoS parameters to the GGSN by carrying the negotiated QoS parameters in the Create PDP Context Request message.

The subscription information of the MTC terminal that is stored by the SGSN includes all MTC features subscribed for by the MTC terminal or the MTC features that have been activated. According to the description in 201, the SGSN also has three implementation methods accordingly:

1) When the MTC terminal sends the QoS requirements, the SGSN may obtain, according to the stored subscription information of the MTC terminal, the maximum QoS requirements that the SGSN can provide, and if the QoS requirements sent by the MTC terminal do not exceed the maximum QoS requirements, the SGSN determines the negotiated QoS parameters according to the QoS requirements sent by the MTC terminal; otherwise, the SGSN determines the negotiated QoS parameters according to the maximum QoS requirements.

2) When the MTC terminal sends the MTC features, the SGSN judges whether these MTC features are the MTC features that have been subscribed for by the MTC terminal; if yes, the QoS parameters suitable for these MTC features are determined to be used as the negotiated QoS parameters.

3) When the MTC terminal sends the service indication request, the SGSN maps the service indication request into corresponding QoS parameters, and may further judge whether the maximum QoS requirements that the subscribed MTC features can provide are satisfied; if yes, the QoS parameters are used as the negotiated QoS parameters.

203. The GGSN allocates an IP address to the MTC terminal as address information of the MTC terminal according to the received Create PDP Context Request message, and returns, in combination with a local policy, a Create PDP Context Response message including the address information of the MTC terminal and the negotiated QoS parameters to the SGSN.

204. The SGSN sends such information as the address information of the MTC terminal and the negotiated QoS parameters to the MTC terminal so that a transmission bearer is established between the MTC terminal and the GGSN, and after receiving the information, the MTC terminal may start data transmission between the MTC terminal and the GGSN.

After the transmission bearer is established, the MTC terminal may send M2M service data to the GGSN. The M2M service data includes: an MTC terminal application layer identity, MTC server address information and corresponding service data contents; the GGSN determines a target MTC server according to the MTC server address information and forwards the M2M service data to the target MTC server; the target MTC server judges a data source according to the MTC terminal application layer identity, for subsequent processing.

In this embodiment, the mobile communication network (such as the GGSN, the SGSN and the BBS in the GSM network) does not parse the MTC terminal application layer identity.

In this embodiment, the target MTC server may belong to a resource pool that accommodates multiple MTC servers. In the resource pool, an anchor MTC server selects an MTC server in the resource pool as the target MTC server. The MTC server address information may be address information of the anchor server. The internal processing procedure of this resource pool is invisible to the mobile communication network.

After receiving the M2M service data sent by the MTC terminal, the target MTC server may send a data receipt acknowledge response message to the GGSN, indicating that the M2M service data has been received, and the data receipt acknowledge response message includes the address information of the MTC terminal so that the GGSN routes the message to the MTC terminal correctly. The GGSN forwards the data receipt acknowledge response message to the MTC terminal according to the address information of the MTC terminal, indicating that the service data sent by the MTC terminal has been confirmed to be received by the target MTC server.

In this embodiment, the MTC terminal application layer identity is independent of a terminal identity used in the mobile communication network. The terminal identity used in the mobile communication network is a conventional identity such as an IMSI or a TLLI, which is referred to as a terminal identity herein. The MTC terminal application layer identity is an identity that allows the MTC server to uniquely identify the MTC terminal. This identity may be an IP address, a device number or another newly defined identity. The embodiments of the present invention do not limit this as long as this identity can uniquely identify an MTC terminal. The description of the MTC terminal application layer identity and the terminal identity is also applicable to other embodiments, and is no longer described additionally.

The MTC server stores the MTC terminal application layer identities of all MTC terminals that belong to the MTC server, and the target MTC server judges, just according to the received MTC terminal application layer identity and the stored MTC terminal application layer identities, the MTC terminal from which the data comes, where the received MTC terminal application layer identity is included in the M2M service data as application layer data. Specifically, the MTC server may store the following information: MTC terminal application layer identities, or MTC terminal application layer identities→an MTC feature list The information means an MTC terminal application layer identity of each MTC terminal that belongs to the MTC server, or an MTC terminal application layer identity of each MTC terminal that belongs to the MTC server, an MTC feature list and a mapping relationship between these MTC terminal application layer identities and the MTC feature list, and the MTC feature list is formed of all MTC features of the MTC terminal. The MTC server may further identify the identity of the MTC terminal by the MTC feature list.

On the basis of the foregoing embodiments, preferably, the SGSN may store or obtain from an HSS the following information:
IMSIs→an MTC feature list The SGSN may pre-store the information in the registration process, or obtain the information from the HSS when necessary. The information may be a part of the subscription information of the MTC terminal, and in 202, the SGSN may determine the negotiated QoS parameters according to the information.

This embodiment provides a method for establishing a bearer for an M2M service when the MTC terminal directly accesses the mobile communication network, where the MTC terminal sends the PDP activation request message to the SGSN, and the PDP activation request message may include at least one of the MTC features, the QoS requirements and the service indication request; the SGSN determines the negotiated QoS parameters according to the PDP activation request message, and sends the negotiated QoS parameters to the GGSN by carrying the negotiated QoS parameters in the Create PDP Context Request message; the GGSN returns, in combination with the local policy, the Create PDP Context Response message including the address information of the MTC terminal and the negotiated QoS parameters to the SGSN; and the SGSN sends such information as the address information of the MTC terminal and the negotiated QoS parameters to the MTC terminal so that the transmission bearer is established between the MTC terminal and the GGSN.

Figure 3:
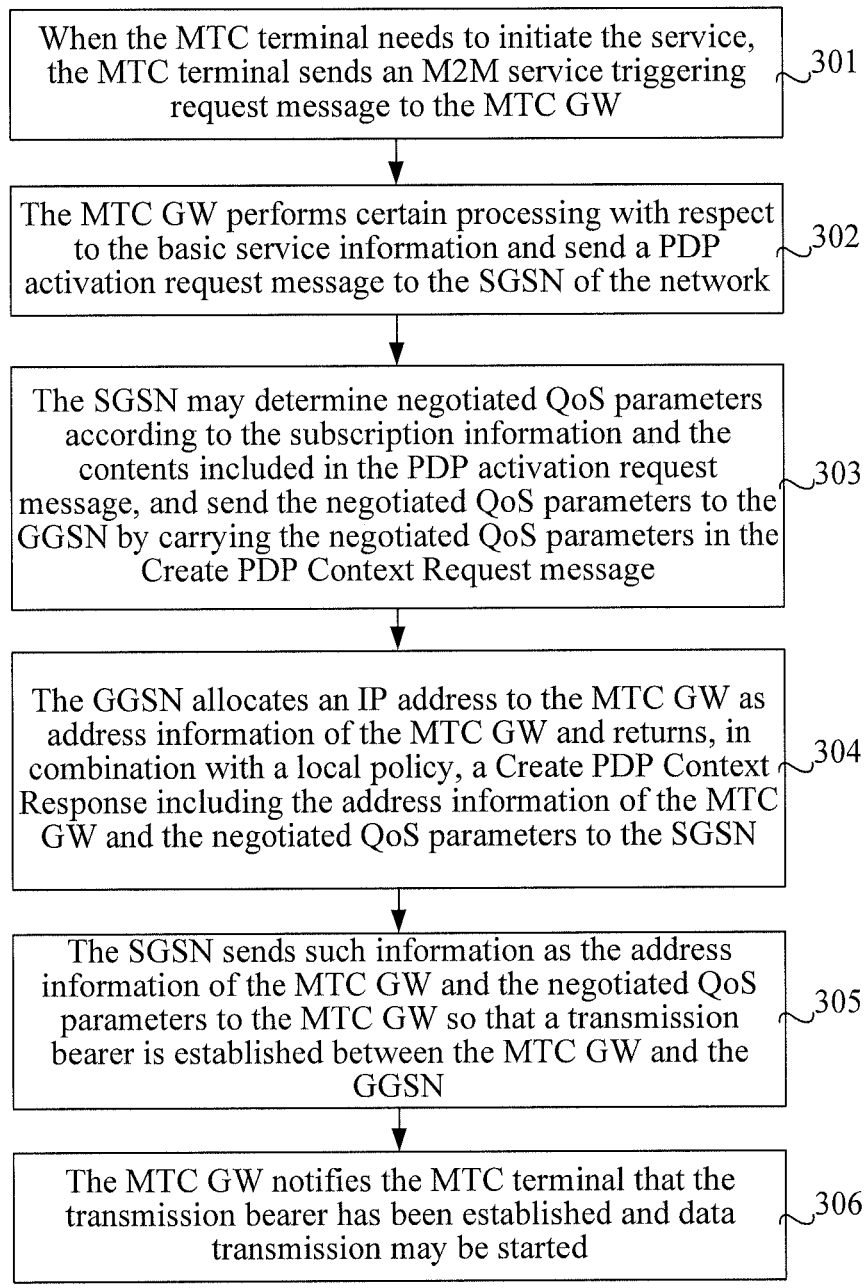
FIG. 3 is a flowchart of a method for establishing a bearer for an M2M service according to a third embodiment of the present invention.

FIG. 3 is a flowchart of a method for establishing a bearer for an M2M service according to a third embodiment of the present invention. This embodiment is directed to the case where an MTC terminal accesses a mobile communication network by an MTC GW and initiates a service on its initiative. In this case, the MTC terminal is invisible to the mobile communication network. The user plane resource establishment request message is specifically a PDP activation request message.

As shown in FIG. 3, this embodiment includes the following parts:

301. When the MTC terminal needs to initiate the service, the MTC terminal sends an M2M service triggering request message to the MTC GW, where the M2M service triggering request message includes an MTC terminal application layer identity, a necessary service feature requirement (optional), and so on.

Because the MTC terminal is invisible to the mobile communication network, the M2M service triggering request message exchanged between the MTC terminal and the MTC GW may be based on the network to which the MTC terminal and the MTC GW are connected, such as a zigbee or a WLAN. The M2M service triggering request message may be considered to be a private message, which includes basic service information for initiating the service, including the MTC terminal application layer identity and the necessary service feature requirement, where the necessary service feature requirement is optional. The information is invisible to the mobile communication network.

302. After receiving the M2M service triggering request message sent by the MTC terminal, the MTC GW needs to perform certain processing on the basic service information in 301 and send a PDP activation request message to the SGSN of the network. Specifically, the MTC GW may send the PDP activation request message to the SGSN by a BSS.

In this embodiment, the QoS negotiation problem as described in the second embodiment also exists.

This embodiment provides processing modes for the basic service information in 301 under two different cases:

First case: the subscription information stored by the SGSN is directed to the MTC GW, and the subscription information of the MTC GW may be a set of MTC features of all MTC terminals that belong to the MTC GW. There are three processing modes as follows.

1) The MTC GW judges, according to the basic service information in 301, which MTC features need to be satisfied in the subscribed MTC features, and sends these MTC features to be satisfied to the SGSN by carrying these MTC features to be satisfied in the PDP activation request message.

2) The MTC GW judges, according to the basic service information in 301, which MTC features need to be satisfied in the subscribed MTC features, obtains QoS requirements according to these MTC features, and sends the QoS requirements to the SGSN by carrying the QoS requirements in the PDP activation request message.

3) The MTC GW judges, according to the basic service information in 301, which MTC features need to be satisfied in the subscribed MTC features, obtains a service indication request according to these MTC features, and sends the service indication request to the SGSN by carrying the service indication request in the PDP activation request message.

For the carrying of the MTC features, many methods, such as carrying an identity, a description or an index value indicating the MTC features, may be used, and as long as the MTC features can be identified, all these methods fall within the scope of the present invention. The QoS requirements refer to QoS parameters requested by the terminal. The three methods may be used separately or in combination. That is, the PDP activation request message may include at least one of the MTC features, the QoS requirements and the service indication request.

Second case: the subscription information stored by the SGSN is directed to each MTC terminal.

In this case, the MTC GW needs to store a correspondence between MTC terminal application layer identities and terminal identities, and the MTC GW sends a terminal identity by carrying the terminal identity in the PDP activation request message. The other processing modes are same as those of the first case.

303. The SGSN sends a Create PDP Context Request message to the GGSN according to the PDP activation request message, where the SGSN may determine negotiated QoS parameters according to the subscription information and the contents (such as at least one of the MTC features, the QoS requirements and the service indication request) included in the PDP activation request message, and send the negotiated QoS parameters to the GGSN by carrying the negotiated QoS parameters in the Create PDP Context Request message.

For the first case, the processing modes of this step are also classified into three kinds accordingly:

1) When the MTC GW sends the QoS requirements, the SGSN may obtain, according to the stored MTC features corresponding to the MTC GW, the maximum QoS requirements that the SGSN can provide, and if the QoS requirements sent by the MTC GW do not exceed the maximum QoS requirements, the SGSN determines the negotiated QoS parameters according to the QoS requirements sent by the MTC GW; otherwise, the SGSN determines the negotiated QoS parameters according to the maximum QoS requirements.

2) When the MTC GW sends the MTC features, the SGSN judges whether these MTC features are the stored MTC features corresponding to the MTC GW; if yes, the QoS parameters suitable for these MTC features are determined to be used as the negotiated QoS parameters.

3) When the MTC GW sends the service indication request, the SGSN maps the service indication request into corresponding QoS parameters, and may further judge whether the maximum QoS requirements that the subscribed MTC features can provide are satisfied; if yes, the QoS parameters are used as the negotiated QoS parameters.

For the second case, the processing modes of this step may also be classified into three kinds accordingly:

1) When the MTC GW sends the QoS requirements, the SGSN searches for, according to the terminal identity included in the PDP activation request message, MTC features that are stored by the SGSN and that correspond to the terminal identity, and obtains, according to the MTC features, the maximum QoS requirements that the SGSN can provide, and if the QoS requirements sent by the MTC GW do not exceed the maximum QoS requirements, the SGSN determines the negotiated QoS parameters according to the QoS requirements sent by the MTC GW; otherwise, the SGSN determines the negotiated QoS parameters according to the maximum QoS requirements.

2) When the MTC GW sends the MTC features, the SGSN searches for, according to the terminal identity included in the PDP activation request message, MTC features that are stored by the SGSN and that correspond to the terminal identity, and judges whether the MTC features sent by the MTC GW are the MTC features that are stored by the SGSN and that correspond to the terminal identity; if yes, the QoS parameters suitable for these MTC features are determined to be used as the negotiated QoS parameters.

3) When the MTC GW sends the service indication request, the SGSN maps the service indication request into corresponding QoS parameters, and may further judge, according to the terminal identity carried in the PDP activation request message, whether the QoS parameters satisfy the maximum QoS requirements that the MTC features corresponding to the terminal identity can provide; if yes, the QoS parameters are used as the negotiated QoS parameters.

304. The GGSN allocates an IP address to the MTC GW as address information of the MTC GW according to the received Create PDP Context Request message, and returns, in combination with a local policy, a Create PDP Context Response message including the address information of the MTC GW and the negotiated QoS parameters to the SGSN.

305. The SGSN sends such information as the address information of the MTC GW and the negotiated QoS parameters to the MTC GW so that a transmission bearer is established between the MTC GW and the GGSN, and after receiving the information, the MTC GW may start data transmission between the MTC GW and the GGSN.

306. The MTC GW notifies the MTC terminal that the transmission bearer has been established and data transmission may be begun.

After the transmission bearer is established, the MTC terminal sends the M2M service data to the MTC GW, where the M2M service data includes: the MTC terminal application layer identity, the MTC server address information and corresponding service data contents; the MTC GW sends the M2M service data to the GGSN, where the M2M service data includes: the MTC terminal application layer identity, the MTC server address information and corresponding service data contents; the GGSN determines a target MTC server according to the MTC server address information, and forwards the M2M service data to the target MTC server; and the target MTC server judges a data source according to the MTC terminal application layer identity, for subsequent processing.

In this embodiment, the mobile communication network (such as the BBS, the SGSN and the GGSN) does not parse the MTC terminal application layer identity.

In this embodiment, the target MTC server may belong to a resource pool that accommodates multiple MTC servers. In the resource pool, there is an anchor MTC server that selects an MTC server in the resource pool as the target MTC server. The MTC server address information may be address information of the anchor server. The internal processing procedure of this resource pool is invisible to the GGSN.

After receiving the service data sent by the MTC terminal, the target MTC server may send a data receipt acknowledge response message to the GGSN, indicating that the service data has been received, and the data receipt acknowledge response message includes the address information of the MTC GW and the MTC terminal application layer identity. The GGSN does not parse the MTC terminal application layer identity, and only forwards the data receipt acknowledge response message to the MTC GW, indicating that the service data sent by the MTC terminal has been confirmed to be received by the target MTC server. After receiving the data receipt acknowledge response message, the MTC GW parses the MTC terminal application layer identity included in the data receipt acknowledge response message, and forwards the data receipt acknowledge response message to the MTC terminal.

In this embodiment, the MTC server stores the MTC terminal application layer identities of all MTC terminals that belong to the MTC server, and the target MTC server judges, just according to the received MTC terminal application layer identity and the stored MTC terminal application layer identities, the MTC terminal from which the data comes, where the received MTC terminal application layer identity is included in the M2M service data as application layer data.

As another implementation, in 301 of this embodiment, when the MTC terminal needs to initiate the service, the M2M service data may be directly sent to the MTC GW so that after the transmission bearer is established, the MTC GW may directly send the M2M service data to the GGSN.

In this embodiment, the MTC server may store the following information: MTC terminal application layer identities, or MTC terminal application layer identities→an MTC feature list, and the SGSN may store or obtain from the HSS the following information: IMSIs→an MTC feature list. For the details, reference may be made to the second embodiment.

In addition, for the case where one MTC GW is simultaneously connected to multiple MTC terminals, when the multiple MTC terminals simultaneously initiate a service or the same MTC terminal simultaneously initiates multiple services with different QoS requirements, the MTC GW needs to deal with multiple different QoS requirements. In this case, if the MTC GW has not sent the PDP activation request message, the MTC GW may initiate, according to the maximum QoS requirement required in the multiple services, the PDP activation request message to the SGSN; if the PDP context has been established, the MTC GW may request, according to the maximum QoS requirement required in the multiple services, the SGSN to modify the PDP context message, or establish a new PDP context for the services with different QoS requirements.

This embodiment provides a method for establishing a bearer for an M2M service when the MTC terminal accesses the mobile communication network by the MTC GW, where the MTC terminal sends the M2M service triggering request message to the MTC GW. The MTC GW performs certain processing on the basic service information included in the M2M service triggering request message, and sends the PDP activation request message to the SGSN, where the PDP activation request message may include at least one of the MTC features, the QoS requirements and the service indication request. The SGSN determines the negotiated QoS parameters according to the PDP activation request message, and sends the negotiated QoS parameters to the GGSN by carrying the negotiated QoS parameters in the Create PDP Context Request message. The GGSN returns, in combination with the local policy, the Create PDP Context Response message including the address information of the MTC gateway and the negotiated QoS parameters to the SGSN. The SGSN sends such information as the address information of the MTC GW and the negotiated QoS parameters to the MTC GW, thereby establishing a transmission bearer between the MTC GW and the GGSN.

The method for establishing a bearer for an M2M service according to the fourth embodiment of the present invention is directed to the case where a group of MTC terminals access the mobile communication network directly and initiate a service on their initiatives.

The process of this embodiment is substantially same as that of the second embodiment, and the main differences between the process of this embodiment and the process of the second embodiment lie in the following aspects:

1) In 201, the PDP activation request message includes at least one of the MTC features, the QoS requirements and the service indication request of a particular MTC terminal, while in this embodiment, the PDP activation request message includes at least one of the MTC features of a group of MTC terminals, the QoS requirements of a group of MTC terminals and the service indication request of a group of MTC terminals, or the PDP activation request message includes a group identity of this group of MTC terminals. The group identity is used for uniquely identifying a group of users, and this group of users share common service features in this group.

In 202, the SGSN determines the negotiated QoS parameters according to at least one of the MTC features, the QoS requirements and the service indication request of the particular MTC terminal, while in this embodiment, the SGSN determines the negotiated QoS parameters according to at least one of the MTC features of a group of MTC terminals, the QoS requirements of a group of MTC terminals and the service indication request of a group of MTC terminals, or the SGSN determines the negotiated QoS parameters according to the group identity.

2) In the second embodiment, the M2M service data sent by the MTC terminal includes the MTC terminal application layer identity, the MTC server address information and the corresponding service data contents, while in this embodiment, the M2M service data sent by the MTC terminals further includes the group identity on the basis of this.

For the case where one MTC terminal belongs to multiple groups simultaneously, the group identity must be carried so that the MTC server may judge, according to the group identity, the group of which the MTC terminal transmits data as a user, thereby performing correct parsing and processing.

The method for establishing a bearer for an M2M service according to the fifth embodiment of the present invention is directed to the case where a group of MTC terminals access the mobile communication network by the MTC GW and initiate the service on their initiatives.

The process of this embodiment is substantially same as that of the third embodiment, and the main differences between the process of this embodiment and the process of the third embodiment lie in the following aspects:

1) The MTC GW may pre-store, by the previous registration process, information about which group the MTC terminals that initiate the service belong to, and may also carry the information in the M2M service triggering request message when the MTC terminals initiate the service.

2) in 302, the PDP activation request message includes at least one of the MTC features, the QoS requirements and the service indication request of a particular MTC terminal, while in this embodiment, the PDP activation request message includes at least one of the MTC features of a group of MTC terminals, the QoS requirements of a group of MTC terminals and the service indication request of a group of MTC terminals, or the PDP activation request message includes a group identity of this group of MTC terminals.

In 303, the SGSN determines the negotiated QoS parameters according to at least one of the MTC features, the QoS requirements and the service indication request of the particular MTC terminal, while in this embodiment, the SGSN determines the negotiated QoS parameters according to at least one of the MTC features of a group of MTC terminals, the QoS requirements of a group of MTC terminals and the service indication request of a group of MTC terminals, or the SGSN determines the negotiated QoS parameters according to the group identity.

3) In the third embodiment, the M2M service data sent by the MTC terminal includes the MTC terminal application layer identity, the MTC server address information and the corresponding service data contents, while in this embodiment, the M2M service data sent by the MTC terminals further includes the group identity on the basis of this.

For the case where one MTC terminal belongs to multiple groups simultaneously, the group identity must be carried so that the MTC server may judge, according to the group identity, the group of which the MTC terminal transmits data as a user, thereby performing correct parsing and processing.

Some M2M applications have the feature of the application network triggered, for example, the MTC server requires some MTC terminals to initiate a particular service at a fixed time interval, the MTC terminals need to judge, according to information notified by the MTC server in advance, whether it is allowed to initiate the service and when to initiate the service, or even may need to judge, according to the information notified by the MTC server in advance, what service needs to be initiated currently, the MTC features to be satisfied by the service, and so on. In this case, although the service is still initiated by the MTC terminals finally, the MTC server plays an assistant role. The following several embodiments are described respectively for various cases where the network assists a particular MTC terminal in initiating a service.

Figure 4:
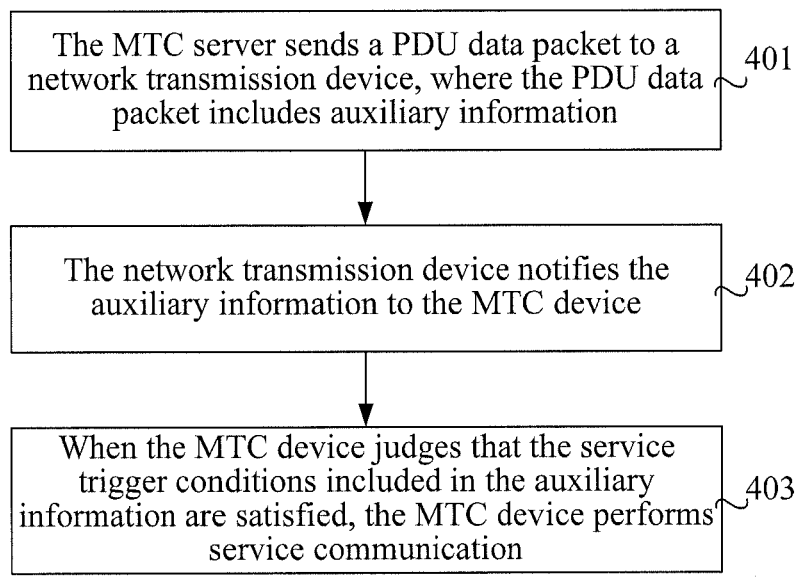
FIG. 4 is a flowchart of a communication method for an M2M service according to a sixth embodiment of the present invention.

FIG. 4 is a flowchart of a communication method for an M2M service according to a sixth embodiment of the present invention. As shown in FIG. 4, this embodiment includes the following parts:

401. The MTC server sends a PDU data packet to a network transmission device, where the PDU data packet includes auxiliary information; the auxiliary information is used for instructing the MTC device to perform service communication when the MTC device judges that the service trigger conditions included in the auxiliary information are satisfied.

402. The network transmission device notifies the auxiliary information to the MTC device.

403. When the MTC device judges that the service trigger conditions included in the auxiliary information are satisfied, the MTC device performs service communication.

In this embodiment, the MTC server sends the PDU data packet including the auxiliary information to the network transmission device so that the network transmission device notifies the auxiliary information to the MTC device. The auxiliary information includes the service trigger conditions, and when the MTC device judges that the service trigger conditions are satisfied, the MTC device performs service communication with the network so that the network triggers the MTC device to initiate the service.

Figure 5:
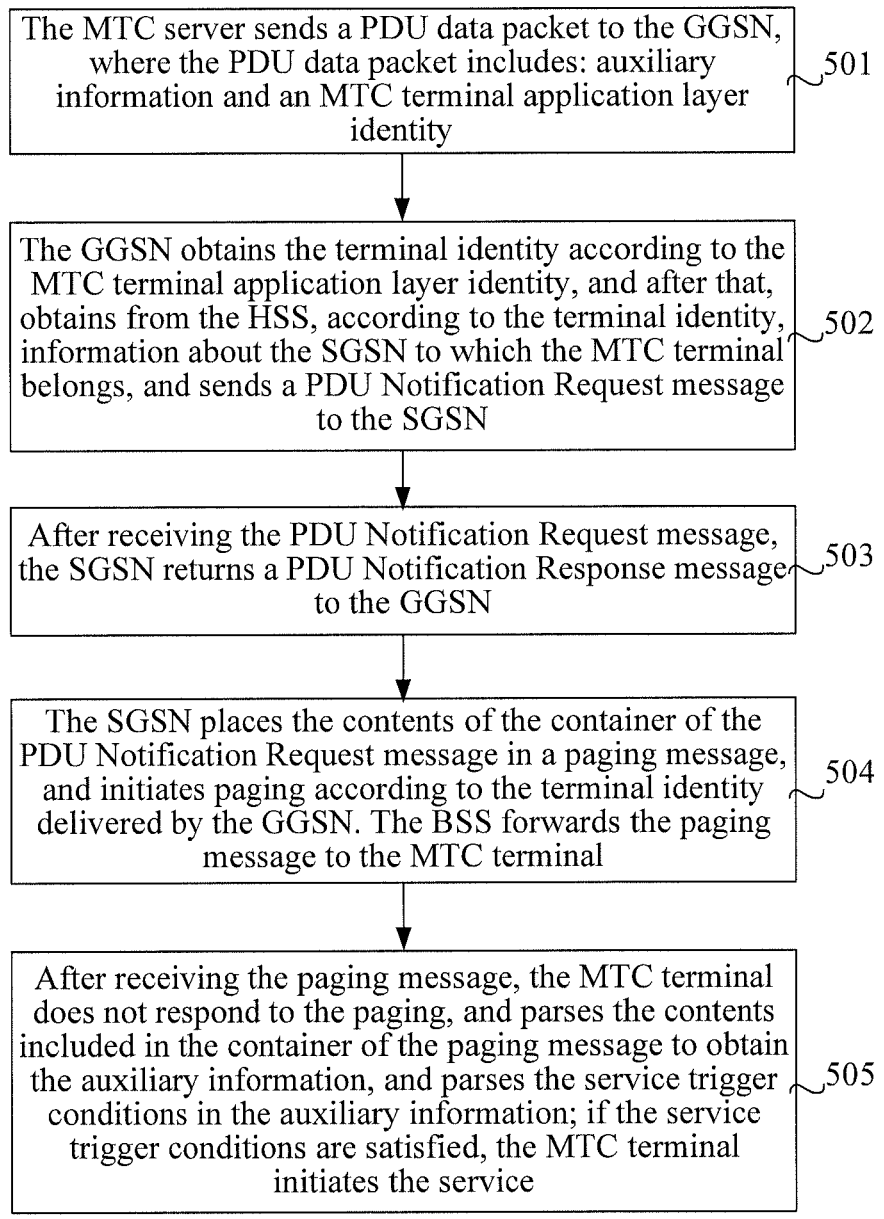
FIG. 5 is a flowchart of a communication method for an M2M service according to a seventh embodiment of the present invention.

FIG. 5 is a flowchart of a communication method for an M2M service according to a seventh embodiment of the present invention. This embodiment is directed to the case where the network assists a particular MTC terminal to initiate a mobile originated (MO) service and the particular MTC terminal directly accesses the mobile communication network, and the MTC device includes an MTC terminal.

In this embodiment, the MTC server stores the following information:

an MTC terminal application layer identity→auxiliary information

The auxiliary information may include but is not limited to such information as service trigger conditions and MTC features. The service trigger conditions may include various kinds of information such as a time window allowing service initiation and a location area allowing service initiation. The MTC server notifies the auxiliary information to the MTC terminal before the service is initiated or periodically to assist the MTC terminal in correctly initiating the service when the service trigger conditions are satisfied.

In this embodiment, an MTC server sends a PDU data packet to a network transmission device so that the network transmission device notifies the auxiliary information to an MTC terminal by using a paging message. The network transmission device includes a GGSN and a SGSN. Specifically, as shown in FIG. 5, this embodiment includes the following parts:

501. The MTC server sends a PDU data packet to the GGSN, where the PDU data packet includes: auxiliary information and an MTC terminal application layer identity.

Further, to identify whether this is a real mobile terminated (MT) service, the PDU data packet may also include indication information. The indication information is used for indicating one of an MO service and an MT service. For example, when the value of the indication information is "1", it indicates that the currently initiated service is not a real MT service, but is an MO service. This example is illustrative only, and any way capable of indicating that the service is a network-assisted MO service falls within the scope of the present invention.

502. The GGSN stores the MTC terminal application layer identity→a terminal identity, the GGSN obtains the terminal identity according to the MTC terminal application layer identity, and after that, obtains from the HSS, according to the terminal identity, information about the SGSN to which the MTC terminal belongs, and sends a PDU Notification Request (PDU Notification Request) message to the SGSN.

The PDU Notification Request message includes the terminal identity, and optionally, also includes the indication information for subsequent use by the SGSN/BSS; and other information such as the auxiliary information and the MTC terminal application layer identity (optional) is put into a container (container) as service data and the container is included in the PDU Notification Request and sent. The service data included in the container is invisible to the network, and the SGSN/BSS does not need to parse the contents of the service data included in the container.

The information to be included in the PDU Notification Request message in this step may be placed in the idle bits of a current existing IE or in an expanded new IE.

503. After receiving the PDU Notification Request message, the SGSN returns a PDU Notification Response message to the GGSN.

504. The SGSN places the contents of the container of the PDU Notification Request message into a paging (paging) message, and initiates paging according to the terminal identity delivered by the GGSN. The BSS forwards the paging message to the MTC terminal.

Similar to 502, the SGSN also places the contents in the container into the paging message as service data, and the BSS does not parse the contents in the container of the paging message, but only pages the terminal according to the terminal identity.

Further, the SGSN may judge, according to the indication information, that the service is not a real MT service, place the contents in the container together with the indication information into the paging message and initiate paging according to the terminal identity delivered by the GGSN. The BSS forwards the paging message to the MTC terminal.

Because the network knows that the service is not a real MT service, the network does not wait for the MTC terminal to return a paging response, nor does the network perform a normal paging retry process.

The modification and expansion of the paging message are similar to the modification and expansion of the PDU Notification Request message in 502, for example: the indication information carried in the paging message may be carried by adding a new IE in the paging message or by expanding an IE such as a cause value IE in the paging message, for example, adding a new cause value explained as "M2M network-assisted MO".

505. After receiving the paging message, the MTC terminal finds that the paging message is paging the MTC terminal, and the MTC terminal may judge, according to the indication information, that the service is not a real MT service so that the MTC terminal does not respond to the paging, and parses the contents included in the container of the paging message to obtain the auxiliary information, and parses the service trigger conditions in the auxiliary information; if the service trigger conditions are satisfied, the MTC terminal initiates the service. For the specific process for the MTC terminal to initiate the service, reference may be made to the second embodiment. When the auxiliary information includes MTC features, the MTC terminal initiates the service according to the MTC features; and when the auxiliary information includes no MTC feature, the MTC terminal initiates the service according to the MTC features stored by the MTC terminal.

Further, in 504, the SGSN may initiate paging according to the RA to which the MTC terminal belongs, or may initiate paging according to a more precise location area granularity. For example, the movement areas of some MTC terminals are limited and these MTC terminals only move between a cell A and a cell B. If the network obtains the movement area information in advance, the SGSN may initiate paging only in the cell A and the cell B. The movement area information obtained by the network in advance may be pre-configured or obtained by the registration process. The movement area information obtained by the network in advance may also be sent by the MTC server to the SGSN by the PDU data packet or the PDU Notification Request message, and in this case, the SGSN is required to parse the relevant contents in the container.

In this embodiment, the MTC server sends the PDU data packet including the auxiliary information to the network transmission device so that the network transmission device notifies the auxiliary information to the MTC terminal by the paging message. The auxiliary information includes the service trigger conditions, and when the MTC terminal judges that the service trigger conditions are satisfied, the MTC terminal performs service communication with the network so that the network triggers the MTC terminal to initiate the service.

Figure 6:
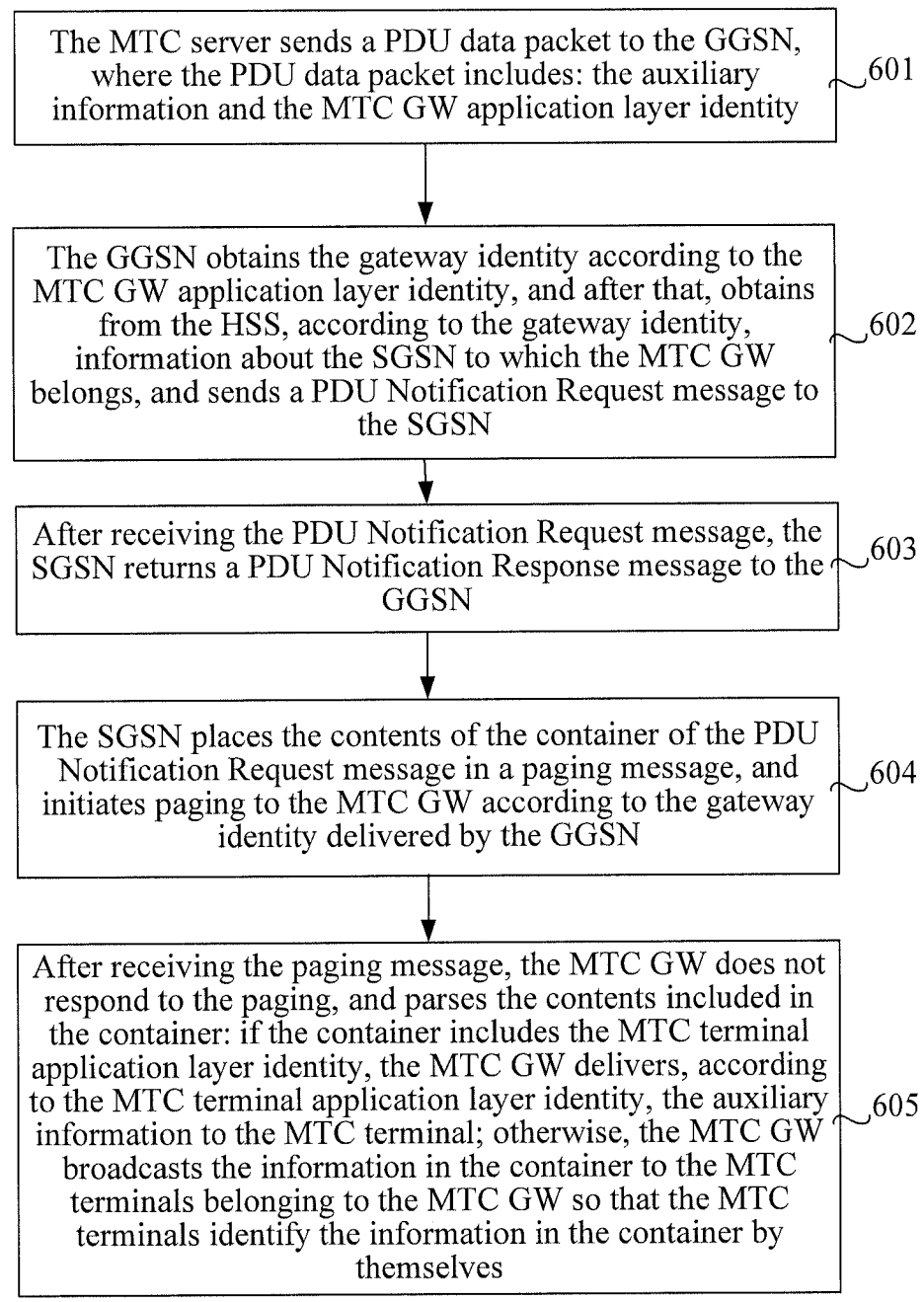
FIG. 6 is a flowchart of a communication method for an M2M service according to an eighth embodiment of the present invention.

FIG. 6 is a flowchart of a communication method for an M2M service according to an eighth embodiment of the present invention. This embodiment is directed to the case where the network assists a particular MTC terminal to initiate an MO service and the particular MTC terminal accesses the mobile communication network by an MTC GW, and the MTC device includes the MTC terminal and the MTC GW. For this case, the network considers the MTC GW as a terminal.

In this embodiment, the MTC server stores the following information:

an MTC terminal application layer identity→an MTC GW application layer identity→auxiliary information The auxiliary information may include but is not limited to such information as service trigger conditions and MTC features. The service trigger conditions may include various kinds of information such as a time window allowing service initiation and a location area allowing service initiation. The MTC server notifies the auxiliary information to the MTC terminal before the service is initiated or periodically to assist the MTC terminal in correctly initiating the service when the service trigger conditions are satisfied.

In this embodiment, the MTC server sends a PDU data packet to the network transmission device so that the network transmission device notifies the auxiliary information to the MTC GW by using a paging message. The network transmission device includes a GGSN and an SGSN. Specifically, as shown in FIG. 6, this embodiment includes the following parts:

601. The MTC server sends a PDU data packet to the GGSN, where the PDU data packet includes: the auxiliary information and the MTC GW application layer identity.

Optionally, the PDU data packet may also include the MTC terminal application layer identity. The MTC terminal application layer identity and the auxiliary information are invisible to the mobile communication network and may be included in the contents of the data packet.

Further, to identify that this is not a real MT service, the PDU data packet may also include indication information. The indication information is used for indicating one of an MO service and an MT service.

602. The GGSN stores an MTC GW application layer identity→a gateway identity, the GGSN obtains the gateway identity according to the MTC GW application layer identity, and after that, obtains from the HSS, according to the gateway identity, information about the SGSN to which the MTC GW belongs, and sends a PDU Notification Request (PDU Notification Request) message to the SGSN.

The PDU Notification Request message includes the gateway identity, and optionally, also includes the indication information for subsequent use by the SGSN/BSS; and other information such as the auxiliary information and the MTC terminal application layer identity (optional) is put into a container as service data and the container is included in the PDU Notification Request and sent. The service data included in the container is invisible to the network, and the SGSN/BSS does not need to parse the contents of the service data included in the container.

The information to be included in the PDU Notification Request message in this step may be placed in the idle bits of a current existing IE or in an expanded new IE.

603. After receiving the PDU Notification Request message, the SGSN returns a PDU Notification Response message to the GGSN.

604. The SGSN places the contents of the container of the PDU Notification Request message into a paging (paging) message, and initiates paging to the MTC GW according to the gateway identity delivered by the GGSN. The BSS forwards the paging message to the MTC GW.

Similar to 602, the SGSN also places the contents in the container into the paging message as service data, and the BSS does not parse the contents in the container of the paging message, but only pages the MTC GW according to the gateway identity.

Further, the SGSN may judge, according to the indication information, that the service is not a real MT service, and place the contents in the container together with the indication information into the paging message and initiate paging to the MTC GW according to the gateway identity delivered by the GGSN.

Because the network knows that the service is not a real MT service, the network does not wait for the MTC GW to return a paging response, nor does the network perform a normal paging retry process.

The modification and expansion of the paging message are similar to the modification and expansion of the PDU Notification Request message in 602, for example: the indication information carried in the paging message may be carried by adding a new IE in the paging message or by expanding an IE such as a cause value IE in the paging message and adding a new cause value explained as "M2M network-assisted MO".

605. After receiving the paging message, the MTC GW finds that the paging message is paging the MTC GW, and may judge, according to the indication information, that the service is not a real MT service so that the MTC GW does not respond to the paging, and parses the contents included in the container: If the container includes the MTC terminal application layer identity, the MTC GW delivers, according to the MTC terminal application layer identity, the auxiliary information to the MTC terminal; otherwise, the MTC GW does not parse the MTC terminal application layer identity, but directly broadcasts the information in the container to the MTC terminals belonging to the MTC GW so that the MTC terminals identify the information in the container by themselves.

In subsequent procedures, the MTC terminal receives the auxiliary information delivered by the MTC GW and parses the service trigger conditions in the auxiliary information. When the service trigger conditions are satisfied, the MTC terminal initiates the service. For the specific process, reference may be made to the third embodiment. When the auxiliary information includes MTC features, the MTC terminal initiates the service according to the MTC features; and when the auxiliary information includes no MTC feature, the MTC terminal initiates the service according to the MTC features stored by the MTC terminal.

Further, in 604, the SGSN may initiate paging according to the RA to which the MTC terminal belongs, or may initiate paging according to a more precise location area granularity. For example, the movement areas of some MTC terminals are limited and these MTC terminals only move between a cell A and a cell B. If the network obtains the movement area information in advance, the SGSN may initiate paging only in the cell A and the cell B. The movement area information obtained by the network in advance may be pre-configured or obtained by the registration process. The movement area information obtained by the network in advance may also be sent by the MTC server to the SGSN by the PDU data packet and the PDU Notification Request message and parsed by the SGSN.

In this embodiment, the MTC server sends the PDU data packet including the auxiliary information to the network transmission device so that the network transmission device notifies the auxiliary information to the MTC GW by the paging message, and the MTC GW notifies the auxiliary information to the MTC terminal. The auxiliary information includes the service trigger conditions, and when the MTC terminal judges that the service trigger conditions are satisfied, the MTC terminal performs service communication with the network so that the network triggers the MTC terminal to initiate the service.

In the processes of the seventh embodiment and the eighth embodiment, the auxiliary information that the MTC server sends to the MTC terminal is included in the container and carried in the paging message. When the data amount of the auxiliary information is very large, the auxiliary information may occupy an excessive number of paging blocks, thereby affecting the paging channel capacity; meanwhile, some auxiliary information should not be known by other MTC terminals as public information, and the method of the seventh embodiment and the eighth embodiment has security risks. Based on this problem, the present invention also provides other two preferred processes. In these processes, the auxiliary information is not sent by using a paging message, but is notified to the MTC terminal over another channel. For the detailed description, reference may be made to the following ninth embodiment and tenth embodiment.

The communication method for an M2M service according to the ninth embodiment of the present invention is directed to the case where the network assists a particular MTC terminal in initiating an MO service and the particular MTC terminal accesses the mobile communication network directly.

This embodiment has the following two processing modes:

1) The network triggering process does not include any auxiliary information.

Specifically, this embodiment is different from the seventh embodiment in that:

In 501, the PDU data packet does not include the auxiliary information, but includes the indication information.

In 502, the PDU Notification Request message sent by the GGSN to the SGSN does not include the auxiliary information.

In 504, the SGSN judges, according to the indication information, that this is not a real MT service so that the indication information is placed in the paging message, and the process of paging the MTC terminal is triggered. The BSS forwards the paging message.

In 505, after receiving the paging message, the MTC terminal judges that this is not a real MT service so that the MTC terminal does not respond to the paging; meanwhile, the MTC terminal establishes a dedicated bearer on its initiative to obtain the auxiliary information from the MTC server. The dedicated bearer may be a signaling bearer or a data bearer, such as an SMS or USSD. This way is suitable for the auxiliary information with a high security requirement, and the MTC terminal obtains the auxiliary information by the dedicated bearer.

2) The network triggering process includes the auxiliary information but the auxiliary information is not directly delivered on a paging channel, and the MTC server sends a PDU data packet to the network transmission device so that the network transmission device notifies the auxiliary information to the MTC terminal by using a downlink channel.

Specifically, 501-503 in this embodiment are same as those in the seventh embodiment, and the MTC server sends the PDU data packet to the GGSN so that the GGSN obtains the terminal identity according to the MTC terminal application layer identity, and the GGSN sends the PDU Notification Request message carrying the terminal identity and the auxiliary information to the SGSN. The difference lies in that:

In 504, the SGSN/BSS does not place the auxiliary information in the paging message, but the paging message carries channel notification information about a channel from which the MTC terminal is going to read the auxiliary information. The channel notification information is used for indicating a downlink channel, where the downlink channel may be a broadcast channel, a notification channel or another dedicated channel. The SGSN/BSS sends the paging message to the MTC terminal according to the terminal identity.

In 505, after receiving the paging message, the MTC terminal judges that this is not a real MT service so that the MTC terminal does not respond to the paging, and meanwhile, reads, according to the channel notification information, the auxiliary information from the downlink channel designated by the network.

As another implementation, the paging message in this embodiment may also not carry the channel notification information, but a channel is pre-configured and the MTC terminal directly reads the auxiliary information from the pre-configured channel.

The communication method for an M2M service according to the tenth embodiment of the present invention is directed to the case where the network assists a particular MTC terminal in initiating an MO service and the particular MTC terminal accesses the mobile communication network by an MTC GW.

This embodiment has the following two processing modes:

1) The network triggering process does not include any auxiliary information.

Specifically, this embodiment is different from the eighth embodiment in that:

In 601, the PDU data packet does not include the auxiliary information, but includes the indication information.

In 602, the PDU Notification Request message sent by the GGSN to the SGSN does not include the auxiliary information.

In 604, the SGSN judges, according to the indication information, that this is not a real MT service so that the indication information is placed in the paging message, and the process of paging the MTC GW is triggered. The BSS forwards the paging message.

In 605, after receiving the paging message, the MTC GW judges that this is not a real MT service so that the MTC GW does not respond to the paging; meanwhile, the MTC GW establishes a dedicated bearer on its initiative to obtain the auxiliary information from the MTC server. The dedicated bearer may be a signaling bearer or a data bearer, such as an SMS or USSD. This way is suitable for the auxiliary information with a high security requirement, and the MTC GW obtains the auxiliary information by the dedicated bearer. After receiving the auxiliary information, the MTC GW forwards the auxiliary information to the corresponding MTC terminal.

2) The network triggering process includes the auxiliary information but the auxiliary information is not directly delivered on a paging channel, and the MTC server sends a PDU data packet to the network transmission device so that the network transmission device notifies the auxiliary information to the MTC GW by using a downlink channel.

Specifically, steps 601-603 in this embodiment are same as those in the eighth embodiment, and the MTC server sends the PDU data packet to the GGSN so that the GGSN obtains the gateway identity according to the MTC gateway application layer identity, and the GGSN sends the PDU Notification Request message carrying the gateway identity and the auxiliary information to the SGSN. The difference lies in that:

In 604, the SGSN/BSS does not place the auxiliary information in the paging message, but the paging message carries channel notification information about a channel from which the MTC GW is going to read the auxiliary information. The channel notification information is used for indicating a downlink channel, where the downlink channel may be a broadcast channel, a notification channel or another dedicated channel. The SGSN/BSS sends the paging message to the MTC GW according to the gateway identity.

In 605, after receiving the paging message, the MTC GW judges that this is not a real MT service so that the MTC GW does not respond to the paging, and meanwhile, reads, according to the channel notification information, the auxiliary information from the channel designated by the network, and sends the auxiliary information to the corresponding MTC terminal.

As another implementation, the paging message in this embodiment may also not carry the channel notification information, but a channel is pre-configured and the MTC GW directly reads the auxiliary information from the pre-configured channel.

The ninth embodiment and the tenth embodiment provide methods for delivering the auxiliary information by a dedicated bearer or a downlink channel, thereby reducing the number of occupied paging blocks and improving the paging channel capacity; and the security is improved by delivering the auxiliary information by the dedicated bearer.

In some practical applications, the M2M service initiated under the assistance of the network may also be directed to a group of MTC terminals. The following several embodiments are described respectively for this case.

Figure 7:
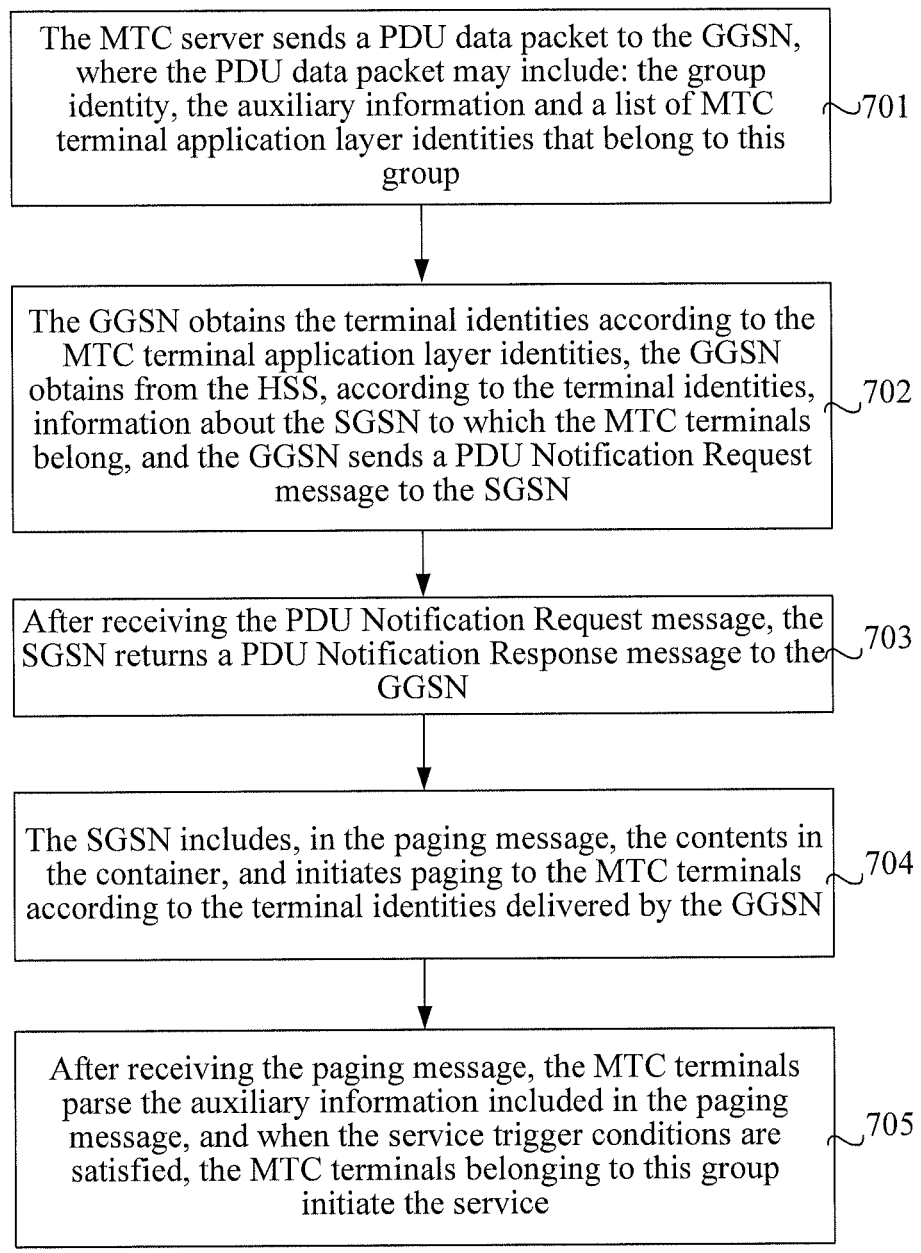
FIG. 7 is a flowchart of a communication method for an M2M service according to an eleventh embodiment of the present invention.

FIG. 7 is a flowchart of a communication method for an M2M service according to an eleventh embodiment of the present invention. This embodiment is directed to the case where the network assists a group of MTC terminals in initiating an MO service and this group of MTC terminals access the mobile communication network directly.

In this embodiment, the auxiliary information may include but is not limited to such information as service trigger conditions and MTC features. The service trigger conditions may include various kinds of information such as a time window allowing service initiation and a location area allowing service initiation.

In this case, the MTC server stores the following information:

a group identity→auxiliary information→MTC terminal application layer identities The MTC server notifies the auxiliary information to a group of MTC terminals before the service is initiated or periodically to assist this group of MTC terminals in initiating the service in time when the service trigger conditions are satisfied.

As shown in FIG. 7, this embodiment includes the following parts:

701. The MTC server sends a PDU data packet to the GGSN, where the PDU data packet may include: the group identity, the auxiliary information and a list of MTC terminal application layer identities that belong to this group. The list of MTC terminal application layer identities and the auxiliary information are mandatory, and the group identity is optional. The group identity and the auxiliary information are invisible to the mobile communication network and may be included in the contents of the data packet.

Further, to identify that this is not a real MT service, the PDU data packet may also include indication information for indicating the currently initiated service is not a real MT service.

702. The GGSN stores the MTC terminal application layer identities→terminal identities, the GGSN obtains the terminal identities according to the MTC terminal application layer identities, the GGSN obtains from the HSS, according to the terminal identities, information about the SGSN to which the MTC terminals belong, and the GGSN sends a PDU Notification Request message to the SGSN.

The PDU Notification Request message includes the terminal identities, and optionally, also includes the indication information; and other information such as the auxiliary information, the MTC terminal application layer identities (optional) and the group identity (optional) is put into a container as service data and the container is included in the PDU Notification Request and sent. The service data included in the container is invisible to the network, and the SGSN/BSS does not need to parse the contents of the service data included in the container.

703. After receiving the PDU Notification Request message, the SGSN returns a PDU Notification Response message to the GGSN.

704. The SGSN includes, in the paging message, the contents in the container, and initiates paging to the MTC terminals according to the terminal identities delivered by the GGSN. The BSS forwards the paging message to the MTC terminal.

Further, the SGSN may judge, according to the indication information, that the service is not a real MT service, and include, in the paging message, the contents in the container together with the indication information, and initiate paging to the MTC terminals according to the terminal identities delivered by the GGSN. The BSS forwards the paging message to the MTC terminals.

Because the network knows that the service is not a real MT service, the network does not wait for the MTC terminals to return a paging response, nor does the network perform a normal paging retry process.

705. After receiving the paging message, the MTC terminals parse the contents of the data packet, parse the auxiliary information in the paging message, and optionally, also parse the group identity in the paging message. When the service trigger conditions are satisfied, the MTC terminals belonging to this group initiate the service. For the specific method, reference may be made to the fourth embodiment. When the auxiliary information includes MTC features, this group of MTC terminals initiate the service according to the MTC features; and when the auxiliary information includes no MTC feature, this group of MTC terminals initiate the service according to the MTC features stored by the MTC terminals themselves.

The MTC terminals may judge, according to an MO/MT indication, that the service is not a real MT service so that the MTC terminals do not respond to the paging.

The newly added information in this embodiment may be carried by expanding an IE in an existing message or by defining a new IE or message. For example, the indication information carried in the paging message may be carried by adding a new IE in the paging message or by expanding an IE such as a cause value IE in the paging message and adding a new cause value explained as "M2M network-assisted MO".

Further, in 704, the SGSN may initiate paging according to movement area information of a group of MTC terminals. For example, the movement areas of some groups of MTC terminals are limited and these MTC terminals only move between a cell A and a cell B. If the network obtains the movement area information in advance, the SGSN may initiate paging only in the cell A and the cell B. The movement area information obtained by the network in advance may be pre-configured, or obtained by the registration process.

The way of delivering the auxiliary information in the ninth embodiment is also applicable to this embodiment and is not repeatedly described here.

This embodiment provides a method for the MTC server to trigger a group of MTC terminals to initiate the service, where the MTC server notifies the auxiliary information to a group of MTC terminals before the service is initiated or periodically, to assist this group of MTC terminals in initiating the service in time when the service trigger conditions are satisfied so that the network triggers the MTC terminals to initiate the service.

Figure 8:
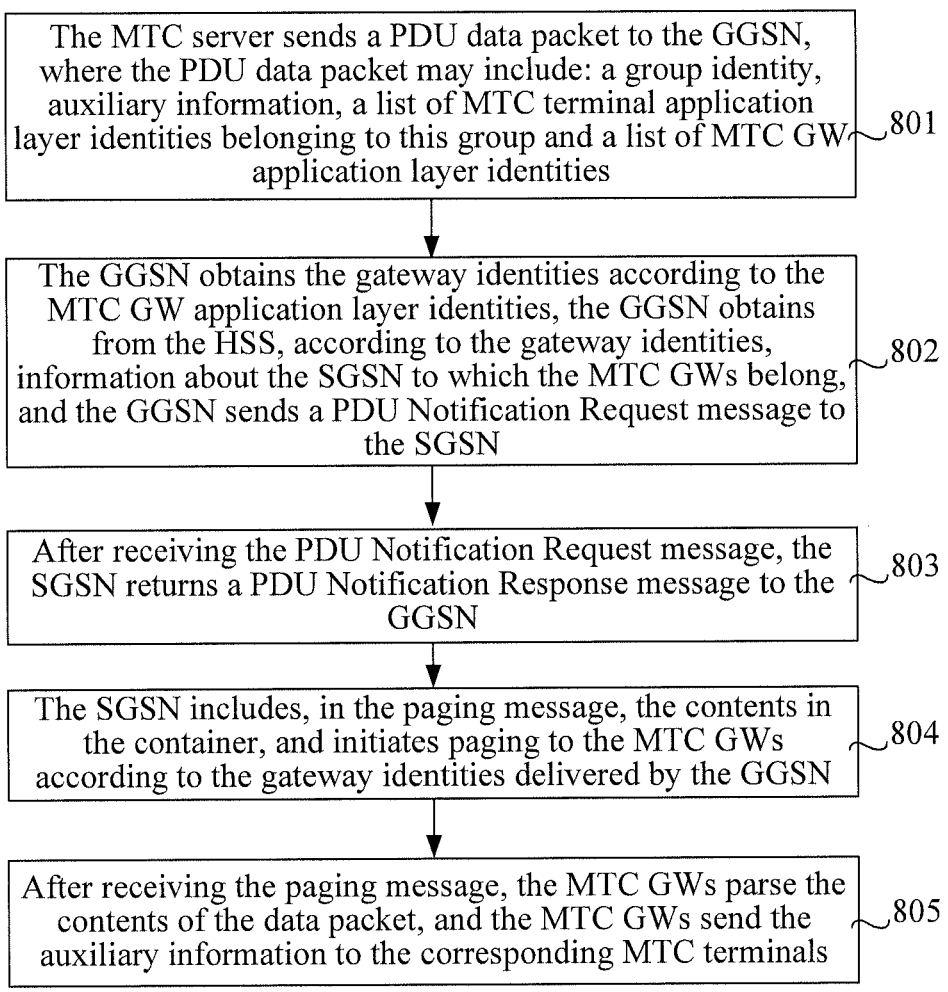
FIG. 8 is a flowchart of a communication method for an M2M service according to a twelfth embodiment of the present invention.

FIG. 8 is a flowchart of a communication method for an M2M service according to a twelfth embodiment of the present invention. This embodiment is directed to the case where the network assists a group of MTC terminals in initiating an MO service and this group of particular MTC terminals access the mobile communication network by MTC GWs. For this case, the network considers the MTC GW as a terminal.

In this embodiment, the auxiliary information may include but is not limited to such information as service trigger conditions and MTC features. The service trigger conditions may include various kinds of information such as a time window allowing service initiation and a location area allowing service initiation.

In this case, the MTC server stores the following information:

a group identity→auxiliary information→MTC terminal application layer identities→MTC GW application layer identities The MTC server notifies the auxiliary information to a group of MTC terminals before the service is initiated or periodically to assist this group of MTC terminals in initiating the service in time when the service trigger conditions are satisfied.

As shown in FIG. 8, this embodiment includes the following parts:

801. The MTC server sends a PDU data packet to the GGSN, where the PDU data packet may include: a group identity, auxiliary information, a list of MTC terminal application layer identities belonging to this group and a list of MTC GW application layer identities, where the list of MTC GW application layer identities and the auxiliary information are required, and only one or both of the list of MTC terminal application layer identities and the group identity may be included. The group identity, the auxiliary information and the list of MTC terminal application layer identities are invisible to the mobile communication network and may be included in the contents of the data packet.

Further, to identify that this is not a real MT service, the PDU data packet may also include indication information for indicating that the currently initiated service is not a real MT service.

802. The GGSN stores the MTC GW application layer identities→gateway identities, the GGSN obtains the gateway identities according to the MTC GW application layer identities, the GGSN obtains from the HSS, according to the gateway identities, information about the SGSN to which the MTC GWs belong, and the GGSN sends a PDU Notification Request message to the SGSN.

The PDU Notification Request message includes the gateway identities, and optionally, also includes the indication information; and other information such as the auxiliary information, the MTC terminal application layer identities (optional) and the group identity (optional) is put into a container as service data and the container is included in the PDU Notification Request and sent. The service data included in the container is invisible to the network, and the SGSN/BSS does not need to parse the contents of the service data included in the container.

803. After receiving the PDU Notification Request message, the SGSN returns a PDU Notification Response message to the GGSN.

804. The SGSN includes, in the paging message, the contents in the container, and initiates paging to the MTC GWs according to the gateway identities delivered by the GGSN. The BSS forwards the paging message to the MTC GWs.

Further, the SGSN may judge, according to the indication information, that the service is not a real MT service, and include, in the paging message, the contents in the container together with the indication information, and initiate paging to the MTC GWs according to the gateway identities delivered by the GGSN. The BSS forwards the paging message to the MTC GWs.

Because the network knows that the service is not a real MT service, the network does not wait for the MTC GWs to return a paging response, nor does the network perform a normal paging retry process.

805. After receiving the paging message, the MTC GWs parse the contents of the data packet. If the data packet carries the list of MTC terminal application layer identities, the MTC GWs directly send the auxiliary information to the corresponding MTC terminals; if the data packet carries the group identity, because the MTC GWs have pre-stored the group identities→the MTC terminal application layer identities, and the MTC GWs send the auxiliary information to the corresponding MTC terminals; or, the MTC GWs directly deliver the auxiliary information according to the group identity, and the MTC terminals identify the auxiliary information by themselves.

The MTC GWs may judge, according to the indication information, that the service is not a real MT service so that the MTC GWs do not respond to the paging.

In subsequent procedures, this group of MTC terminals receive the auxiliary information and parse the service trigger conditions in the auxiliary information. When the service trigger conditions are satisfied, this group of MTC terminals initiate the service. For the specific method, reference may be made to the fifth embodiment. When the auxiliary information includes MTC features, this group of MTC terminals initiate the service according to the MTC features; and when the auxiliary information includes no MTC feature, this group of MTC terminals initiate the service according to the MTC features stored by the MTC terminals themselves.

The newly added information in this embodiment may be carried by expanding an IE in an existing message or by defining a new IE or message. For example, the indication information carried in the paging message may be carried by adding a new IE in the paging message or by expanding an IE such as a cause value IE in the paging message and adding a new cause value explained as "M2M network-assisted MO".

Further, in 804, the SGSN may initiate paging according to movement area information of a group of MTC terminals. For example, the movement areas of some groups of MTC terminals are limited and these MTC terminals only move between a cell A and a cell B. If the network obtains the movement area information in advance, the SGSN may initiate paging only in the cell A and the cell B. The movement area information obtained by the network in advance may be pre-configured, or obtained by the registration process.

The method provided by the tenth embodiment is also applicable to this embodiment, and is not repeatedly described here.

This embodiment provides a method for the MTC server to trigger a group of MTC terminals to initiate the service, and the MTC server notifies the auxiliary information to a group of MTC terminals before the service is initiated or periodically, to assist this group of MTC terminals in initiating the service in time when the service trigger conditions are satisfied so that the network triggers the MTC terminals to initiate the service.

The processes of the eleventh and twelfth embodiments implement the paging according to the terminal identities and the gateway identities, but if the number of MTC terminals in one group is huge, or a large number of MTC GWs is involved, the network must deliver multiple paging messages. Actually, correct paging may also be implemented by using the group identity, and the following several embodiments are described respectively for this case.

Figure 9:
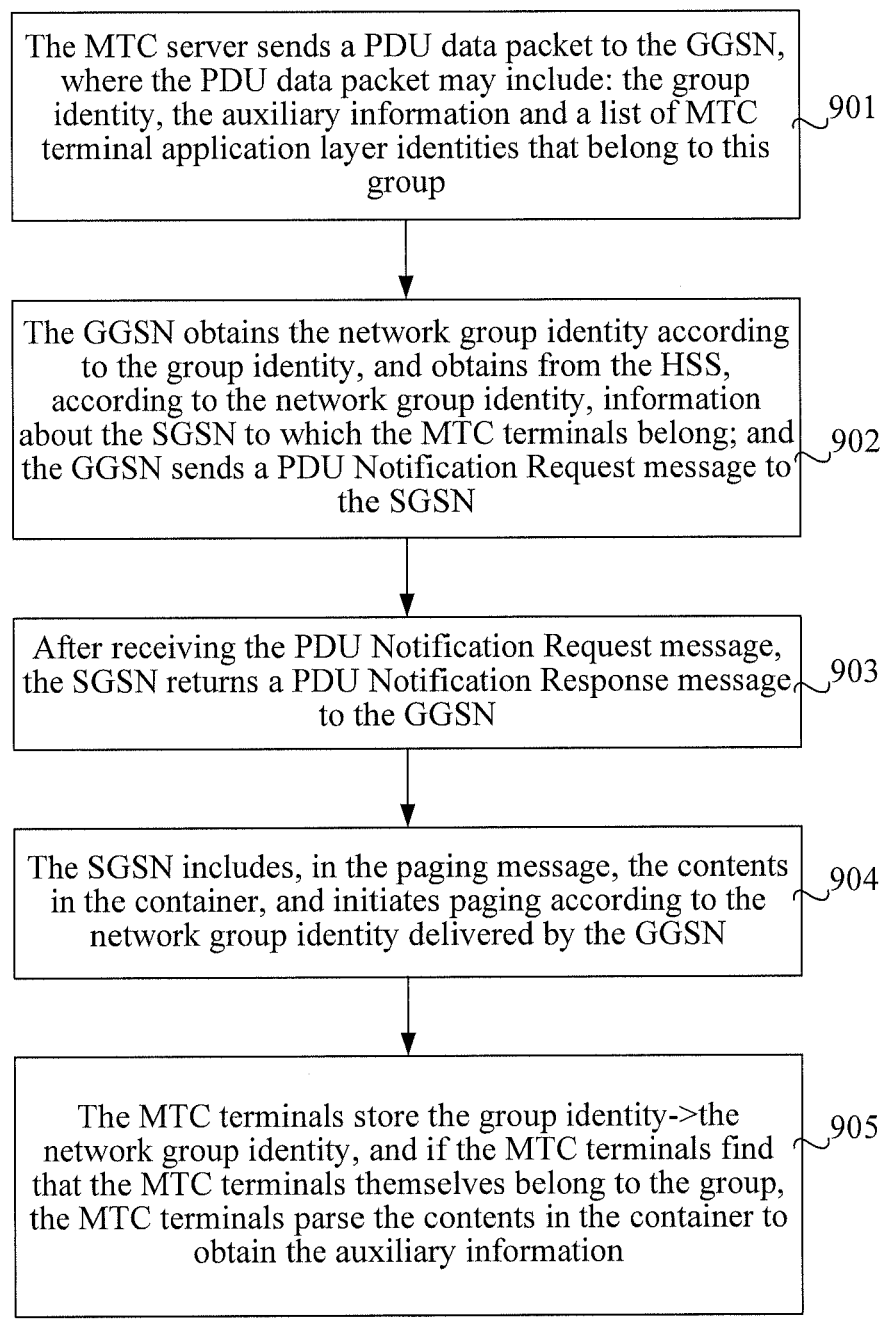
FIG. 9 is a flowchart of a communication method for an M2M service according to a thirteenth embodiment of the present invention.

FIG. 9 is a flowchart of a communication method for an M2M service according to a thirteenth embodiment of the present invention. This embodiment is directed to the case where the network assists a group of MTC terminals in initiating an MO service and this group of MTC terminals access the mobile communication network directly.

In this embodiment, the auxiliary information may include but is not limited to such information as service trigger conditions and MTC features. The service trigger conditions may include various kinds of information such as a time window allowing service initiation and a location area allowing service initiation.

In this case, the MTC server stores the following information:

a group identity→auxiliary information→MTC terminal application layer identities The MTC server notifies the auxiliary information to a group of MTC terminals before the service is initiated or periodically to assist this group of MTC terminals in initiating the service in time when the service trigger conditions are satisfied.

As shown in FIG. 9, this embodiment includes the following parts:

901. The MTC server sends a PDU data packet to the GGSN, where the PDU data packet may include: the group identity, the auxiliary information and a list of MTC terminal application layer identities that belong to this group.

The group identity and the auxiliary information are required, and the list of MTC terminal application layer identities is optional. The auxiliary information and the list of MTC terminal application layer identities are invisible to the mobile communication network and may be included in the contents of the data packet.

Further, to identify that this is not a real MT service, the PDU data packet may also include indication information for indicating that the currently initiated service is not a real MT service.

902. The GGSN stores a group identity→a network group identity. The GGSN obtains the network group identity according to the group identity, and obtains from the HSS, according to the network group identity, information about the SGSN to which the MTC terminals belong; and the GGSN sends a PDU Notification Request message to the SGSN.

The PDU Notification Request message includes the network group identity, and optionally, also includes the indication information; and other information such as the auxiliary information and the MTC terminal application layer identity (optional) is put into a container as service data and the container is included in the PDU Notification Request message and sent. The service data included in the container is invisible to the network, and the SGSN/BSS does not need to parse the contents of the service data included in the container.

The difference between the group identity and the network group identity in this embodiment lies in that the network group identity is an identity that may uniquely identify one group in the mobile communication network, while the group identity is an identity that uniquely identifies one group in the application layer. The definitions of the two identities are independent of each other. For example, one of the implementation methods of 902 may be that the group identity corresponds to a special IMSI, and the special IMSI is used as the network group identity, that is, the GGSN stores the group identity→the special IMSI. Because the HSS originally stores the IMSI, the original process for the GGSN to query the SGSN in the HSS does not need to be modified; definitely, a new definition of the network group identity may also be introduced, and in this case, the HSS needs to be modified synchronously.

903. After receiving the PDU Notification Request message, the SGSN returns a PDU Notification Response message to the GGSN.

904. The SGSN includes, in the paging message, the contents in the container, and initiates paging according to the network group identity delivered by the GGSN. The BSS forwards the paging message on a paging channel.

Specifically, the SGSN may judge, according to the indication information, that the service is not a real MT service, and include, in the paging message, the contents in the container together with the indication information, and initiate paging according to the network group identity delivered by the GGSN. The BSS forwards the paging message on the paging channel.

Because the network knows that the service is not a real MT service, the network performs a normal paging retry process without waiting for the MTC terminals to return a paging response.

905. The MTC terminals store the group identity→the network group identity, and if the MTC terminals find that the MTC terminals themselves belong to the group, the MTC terminals parse the contents in the container to obtain the auxiliary information.

In subsequent procedures, this group of MTC terminals receive the auxiliary information and parse the service trigger conditions in the auxiliary information. When the service trigger conditions are satisfied, this group of MTC terminals initiate the service. For the specific method, reference may be made to the fourth embodiment. When the auxiliary information includes MTC features, this group of MTC terminals initiate the service according to the MTC features; and when the auxiliary information includes no MTC feature, this group of MTC terminals initiate the service according to the MTC features stored by the MTC terminals themselves.

The newly added information in this embodiment may be carried by expanding an IE in an existing message or by defining a new IE or message. For example, the indication information carried in the paging message may be carried by adding a new IE in the paging message or by expanding an IE such as a cause value IE in the paging message and adding a new cause value explained as "M2M network-assisted MO".

Further, in 904, the SGSN may initiate paging according to movement area information of a group of MTC terminals. For example, the movement areas of some groups of MTC terminals are limited and these MTC terminals only move between a cell A and a cell B. If the network obtains the movement area information in advance, the SGSN may initiate paging only in the cell A and the cell B. The movement area information obtained by the network in advance may be pre-configured, or obtained by the registration process.

The way of delivering the auxiliary information in the ninth embodiment is also applicable to this embodiment and is not repeatedly described here.

This embodiment provides a method for the MTC server to trigger a group of MTC terminals to initiate the service, and the MTC server notifies the auxiliary information to a group of MTC terminals before the service is initiated or periodically, to assist this group of MTC terminals in initiating the service in time when the service trigger conditions are satisfied so that the network triggers the MTC terminals to initiate the service. This embodiment implements the paging of a group of MTC terminals by using the group identity for routing.

Figure 10:
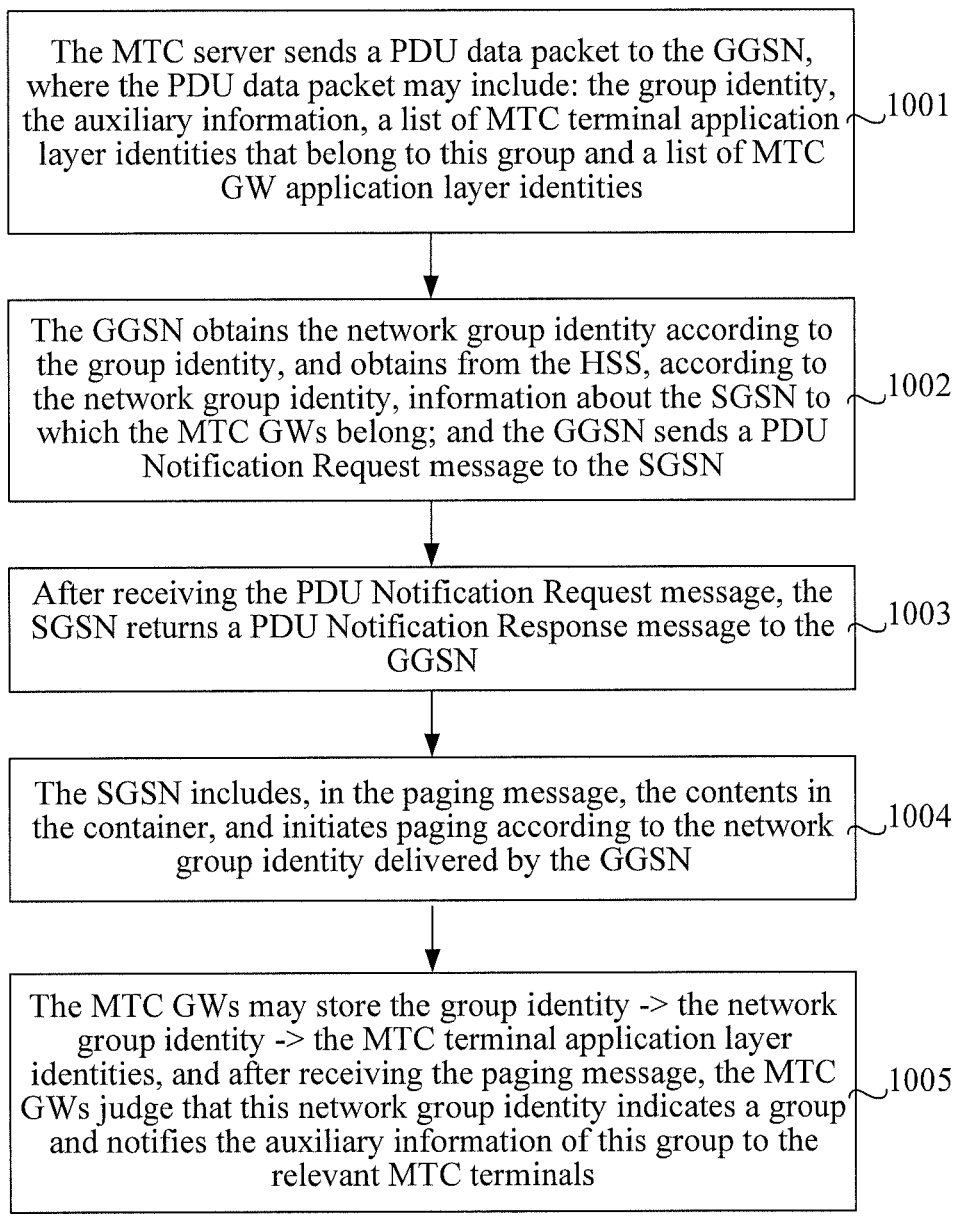
FIG. 10 is a flowchart of a communication method for an M2M service according to a fourteenth embodiment of the present invention.

FIG. 10 is a flowchart of a communication method for an M2M service according to a fourteenth embodiment of the present invention. This embodiment is directed to the case where the network assists a group of MTC terminals in initiating an MO service and this group of MTC terminals access the mobile communication network by MTC GWs.

In this embodiment, the auxiliary information may include but is not limited to such information as service trigger conditions and MTC features. The service trigger conditions may include various kinds of information such as a time window allowing service initiation and a location area allowing service initiation.

In this case, the MTC server stores the following information:

a group identity→auxiliary information→MTC terminal application layer identities→MTC GW application layer identities The MTC server notifies the auxiliary information to a group of MTC terminals before the service satisfies the service trigger conditions or periodically to assist this group of MTC terminals in initiating the service in time when the service trigger conditions are satisfied.

As shown in FIG. 10, this embodiment includes the following parts:

1001. The MTC server sends a PDU data packet to the GGSN, where the PDU data packet may include: the group identity, the auxiliary information, a list of MTC terminal application layer identities that belong to this group and a list of MTC GW application layer identities.

The group identity and the auxiliary information are required, and the list of MTC terminal application layer identities and the list of MTC GW application layer identities are optional. The auxiliary information, the list of MTC terminal application layer identities and the list of MTC GW application layer identities are invisible to the mobile communication network and may be included in the contents of the data packet.

Further, to identify that this is not a real MT service, the PDU data packet may also include indication information for indicating that the currently initiated service is not a real MT service.

1002. The GGSN stores a group identity→a network group identity. The GGSN obtains the network group identity according to the group identity, and obtains from the HSS, according to the network group identity, information about the SGSN to which the MTC GWs belong; and the GGSN sends a PDU Notification Request message to the SGSN.

The PDU Notification Request message includes the network group identity, and optionally, also includes the indication information; and other information such as the auxiliary information, the MTC terminal application layer identities (optional) and the MTC GW application layer identities (optional) is put into a container as service data and the container is included in the PDU Notification Request message and sent. The service data included in the container is invisible to the network, and the SGSN/BSS does not need to parse the contents of the service data included in the container.

The difference between the group identity and the network group identity in this embodiment lies in that the network group identity is an identity that may uniquely identify one group in the mobile communication network, while the group identity is an identity that uniquely identifies one group in the application layer. The definitions of the two identities are independent of each other. For example, one of the implementation methods of 1002 may be that the group identity corresponds to a special IMSI, and the special IMSI is used as the network group identity, that is, the GGSN stores the group identity→the special IMSI. Because the HSS originally stores the IMSI, the original process for the GGSN to query the SGSN in the HSS does not need to be modified; definitely, a new definition of the network group identity may also be introduced, and in this case, the HSS needs to be modified synchronously.

1003. After receiving the PDU Notification Request message, the SGSN returns a PDU Notification Response message to the GGSN.

1004. The SGSN includes, in the paging message, the contents in the container, and initiates paging according to the network group identity delivered by the GGSN. The BSS forwards the paging message on a paging channel.

Specifically, the SGSN may judge, according to the indication information, that the service is not a real MT service, and include, in the paging message, the contents in the container together with the indication information, and initiate paging according to the network group identity delivered by the GGSN. The BSS forwards the paging message on the paging channel.

Because the network knows that the service is not a real MT service, the network performs a normal paging retry process without waiting for the MTC terminals to return a paging response.

1005. The MTC GWs may store the group identity→the network group identity→the MTC terminal application layer identities, and after receiving the paging message, the MTC GWs judge that this network group identity indicates a group and notifies the auxiliary information of this group to the relevant MTC terminals.

Alternatively, the MTC GWs may also store the group identity→the network group identity, and between the MTC GWs and the MTC terminals, addressing is also performed by the group identity. The MTC GWs notify the auxiliary information of this group to the relevant MTC terminals, and the MTC terminals judge, according to the group identity, whether the MTC terminals themselves belong to this group.

The MTC GWs may judge, according to the indication information, that the service is not a real MT service so that the MTC GWs do not respond to the paging.

In subsequent procedures, this group of MTC terminals receive the auxiliary information and parse the service trigger conditions in the auxiliary information. When the service trigger conditions are satisfied, this group of MTC terminals initiate the service. For the specific method, reference may be made to the fifth embodiment. When the auxiliary information includes MTC features, this group of MTC terminals initiate the service according to the MTC features; and when the auxiliary information includes no MTC feature, this group of MTC terminals initiate the service according to the MTC features stored by the MTC terminals themselves.

The newly added information in this embodiment may be carried by expanding an IE in an existing message or by defining a new IE or message. For example, the indication information carried in the paging message may be carried by adding a new IE in the paging message or by expanding an IE such as a cause value IE in the paging message and adding a new cause value explained as "M2M network-assisted MO".

Further, in 1004, the SGSN may initiate paging according to movement area information of a group of MTC terminals. For example, the movement areas of some groups of MTC terminals are limited and these MTC terminals only move between a cell A and a cell B. If the network obtains the movement area information in advance, the SGSN may initiate paging only in the cell A and the cell B. The movement area information obtained by the network in advance may be pre-configured, or obtained by the registration process.

The way of delivering the auxiliary information in the ninth embodiment is also applicable to this embodiment and is not repeatedly described here.

This embodiment provides a method for the MTC server to trigger a group of MTC terminals to initiate the service, and the MTC server notifies the auxiliary information to a group of MTC terminals before the service is initiated or periodically, to assist this group of MTC terminals in initiating the service in time when the service trigger conditions are satisfied so that the network triggers the MTC terminals to initiate the service. This embodiment implements the paging of MTC GWs to which a group of MTC terminals belong by using the group identity for routing.

The seventh to fourteenth embodiments describe the case where the MTC server initiates an MO service. The embodiments of the present invention are not limited to this and are also applicable to the case where the MTC server initiates an MT service, with the difference being that: after receiving the paging message, the MTC terminals or the MTC GWs respond to the paging message in time, and the SGSN also waits to receive the paging response of the MTC terminals or the MTC GWs.

Figure 11:
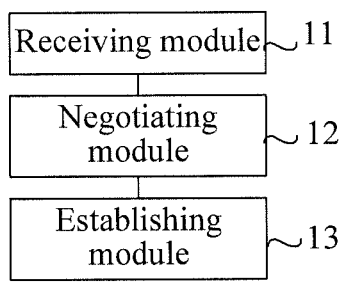
FIG. 11 is a schematic structural diagram of a network transmission device according to a fifteenth embodiment of the present invention.

FIG. 11 is a schematic structural diagram of a network transmission device according to a fifteenth embodiment of the present invention. As show in FIG. 11, this embodiment may include: a receiving module 11, a negotiating module 21 and an establishing module 13, where:

the receiving module 11 is configured to receive a user plane resource establishment request message sent by an MTC device, where the user plane resource establishment request message includes at least one of MTC features, QoS requirements, a service indication request and a group identity;

the negotiating module 12 is configured to determine negotiated QoS parameters according to the user plane resource establishment request message; and the establishing module 13 is configured to establish a transmission bearer with the MTC device according to the negotiated QoS parameters.

The negotiating module 12 may specifically be configured to: when the MTC features are the MTC features subscribed for by the MTC device, determine the negotiated QoS parameters according to the MTC features; or, obtain, according to the MTC features subscribed for by the MTC device, the maximum QoS requirements capable of being provided, and when the QoS requirements do not exceed the maximum QoS requirements, determine the negotiated QoS parameters according to the QoS requirements; when the QoS requirements exceed the maximum QoS requirements, determine the negotiated QoS parameters according to the maximum QoS requirement; or, map the service indication request into the QoS parameters, and when the QoS parameters satisfy the maximum QoS requirements, use the QoS parameters as the negotiated QoS parameters.

Specifically, the network transmission device according to this embodiment may include the SGSN and the GGSN in any one of the second to fifth method embodiments, and for the procedures for implementing the specific functions of the modules in this embodiment, reference may be made to relevant description in any one of the second to fifth method embodiments, which are not repeatedly described here.

The network transmission device according to this embodiment may implement the establishing of a bearer for an M2M service, where the receiving module receives the user plane resource establishment request message sent by the MTC device, and the user plane resource establishment request message includes at least one of the MTC features, the QoS requirements, the service indication request and the group identity; the negotiating module determines the negotiated QoS parameters according to the user plane resource establishment request message; and the establishing module establishes a transmission bearer with the MTC device.

Figure 12:
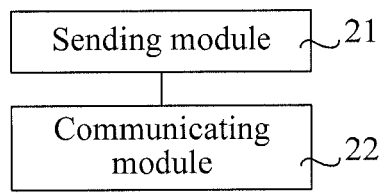
FIG. 12 is a schematic structural diagram of a machine type communication server according to a sixteenth embodiment of the present invention.

FIG. 12 is a schematic structural diagram of a machine type communication server according to a sixteenth embodiment of the present invention. As shown in FIG. 12, this embodiment may include: a sending module 21 and a communicating module 22, where:

the sending module 21 is configured to send a PDU data packet to a network transmission device, where the PDU data packet includes auxiliary information so that the network transmission device notifies the auxiliary information to an MTC device, where the auxiliary information is used for instructing the MTC device to perform service communication when the MTC device judges that service trigger conditions included in the auxiliary information are satisfied; and the communicating module 22 is configured to perform service communication with the MTC device when the MTC device judges that the service trigger conditions included in the auxiliary information are satisfied.

Specifically, the MTC server according to this embodiment may be the MTC server in any one of the seventh to fourteenth method embodiments, and for the procedures for implementing the specific functions of the modules in this embodiment, reference may be made to relevant description in any one of the seventh to fourteenth method embodiments, which are not repeatedly described here.

In this embodiment, the sending module sends the PDU data packet including the auxiliary information to the network transmission device so that the network transmission device notifies the auxiliary information to the MTC device. The auxiliary information includes service trigger conditions, and when the MTC device judges that the service trigger conditions are satisfied, the communicating module performs service communication with the MTC device so that the network triggers the MTC device to initiate the service.

Figure 13:
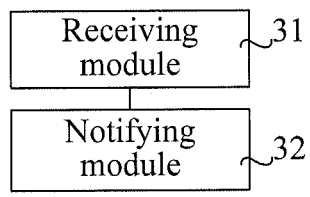
FIG. 13 is a schematic structural diagram of a network transmission device according to a seventeenth embodiment of the present invention.

FIG. 13 is a schematic structural diagram of a network transmission device according to a seventeenth embodiment of the present invention. As shown in FIG. 13, this embodiment may include: a receiving module 31 and a notifying module 32, where:

the receiving module 31 is configured to receive a PDU data packet sent by an MTC server, where the PDU data packet includes auxiliary information; and the notifying module 32 is configured to notify the auxiliary information to an MTC device, where the auxiliary information is used for instructing the MTC device to perform service communication when the MTC device judges that service trigger conditions included in the auxiliary information are satisfied.

The notifying module 32 is specifically configured to notify the auxiliary information to the MTC device by using a paging message or a downlink channel.

Specifically, the network transmission device according to this embodiment may include the SGSN and the GGSN in any one of the seventh to fourteenth method embodiments, and for the procedures for implementing the specific functions of the modules in this embodiment, reference may be made to relevant description in any one of the seventh to fourteenth method embodiments, which are not repeatedly described here.

In this embodiment, the receiving module receives the PDU data packet including the auxiliary information, and the notifying module notifies the auxiliary information to the MTC device, where the auxiliary information includes the service trigger conditions so that when the MTC device judges that the service trigger conditions are satisfied, the MTC device performs service communication with the network so that the network triggers the MTC device to initiate the service.

Persons of ordinary skill in the art may understand that all or part of steps in the above method embodiments may be implemented by relevant hardware instructed by a program. The program may be stored in a computer readable storage medium, and when executed, may include the steps of the above method embodiments; and the foregoing storage medium may be any medium capable of storing program codes, such as an ROM, an RAM, a magnetic disk, and a CD-ROM.

Finally, it should be noted that the foregoing embodiments are used only to describe the technical solutions of the embodiments of the present invention instead of limiting the technical solutions of the embodiments of the present invention. Although the present invention are described in detail with reference to the foregoing embodiments, persons of ordinary skill in the art should understand that they can still make modifications to the technical solutions described in the foregoing embodiments or make equivalent substitutions to some technical features thereof without departing from the spirit and scope of the technical solutions of the embodiments of the present invention.

What is claimed is:

1. A method for establishing a bearer for a machine to machine (M2M) service, comprising:

receiving, by a network transmission device, a packet data protocol (PDP) activation request message sent by a machine type communication (MTC) terminal requesting initiation of the M2M service, wherein the PDP activation request message has content including a group identity of a group of MTC terminals, and wherein the MTC terminal belongs to the group of MTC terminals that share common service features identified by the group identity;

determining, by the network transmission device, negotiated quality of service (QoS) parameters for the MTC terminal according to the group identity, an internet protocol (IP) address being allocated to the MTC terminal according to the received PDP activation request message;

sending, by the network transmission device, the negotiated QoS parameters and the IP address to the MTC terminal, so that a transmission bearer is established with the MTC terminal;

receiving, by the network transmission device, a protocol data unit (PDU) data packet from a MTC server, wherein the PDU data packet comprises indication information other than auxiliary information, and wherein the indication information is used to indicate that a service is a network-assisted mobile originated (MO) service; and notifying, by the network transmission device, the indication information to the MTC terminal, wherein the indication information is used for the MTC terminal to establish a dedicated bearer based on initiative of the MTC terminal to obtain the auxiliary information from the MTC server, wherein the auxiliary information comprises service trigger conditions, and the service trigger conditions are used for the MTC terminal to perform the M2M service initiation requesting when the MTC terminal judges that service trigger conditions are satisfied.

2. The method according to claim 1, wherein the PDU data packet received from the MTC server includes the auxiliary information, and the auxiliary information includes the service trigger conditions; and the method includes notifying, by the network transmission device, the MTC terminal of the auxiliary information so that the service trigger conditions included in the auxiliary information are used for the MTC terminal to perform the M2M service initiation requesting when the MTC terminal judges that service trigger conditions are satisfied.

3. The method according to claim 2, wherein the notifying, by the network transmission device, the auxiliary information to the MTC terminal comprises:

sending, by the network transmission device, a paging message to the MTC terminal, wherein the paging message carries channel notification information indicating a downlink channel from which the MTC terminal is to read the auxiliary information.

4. The method according to claim 3, wherein the PDU data packet further comprises the group identity, and the sending, by the network transmission device, of the paging message to the MTC terminal comprises:

obtaining, by the network transmission device, a network group identity according to the group identity;

initiating, by the network transmission device, the paging message according to the network group identity; and sending, by the network transmission device, the paging message to the MTC terminal.

5. The method according to claim 2, wherein the service trigger conditions comprise a time window allowing service initiation and a location area allowing service initiation.

6. The method according to claim 1, wherein the notifying, by the network transmission device, the indication information to the MTC terminal comprises:

sending, by the network transmission device, a paging message to the MTC terminal, wherein the paging message carries the indication information.

7. The method according to claim 6, wherein the PDU data packet further comprises the group identity; and the sending, by the network transmission device, a paging message to the MTC terminal comprises:

obtaining, by the network transmission device, a network group identity according to the group identity;

initiating, by the network transmission device, the paging message according to the network group identity; and sending, by the network transmission device, the paging message to the MTC terminal.

8. The method according to claim 1, wherein the service trigger conditions comprise a time window allowing service initiation and a location area allowing service initiation.

9. A network transmission device, comprising:

a memory;

a processor coupled to the memory, the processor configured to:

receive a packet data protocol (PDP) activation request message sent by a machine type communication (MTC) terminal requesting initiation of the M2M service, wherein the PDP activation request message has content including a group identity of a group of MTC terminals, and wherein the MTC terminal belongs to the group of MTC terminals that share common service features identified by the group identity;

determine negotiated QoS parameters for the MTC terminal according to the group identity; and wherein an internet protocol (IP) address being allocated to the MTC terminal according to the received PDP activation request message, and the negotiated QoS parameters and the IP address are provided to the MTC terminal so that a transmission bearer is established with the MTC terminal, a protocol data unit (PDU) data packet is received from a MTC server, the PDU data packet comprises indication information other than auxiliary information, and the indication information is used to indicate that a service is a network-assisted mobile originated (MO) service, the MTC terminal is notified of the indication information, and the indication information is used for the MTC terminal to establish a dedicated bearer based on initiative of the MTC terminal to obtain the auxiliary information from the MTC server, and the auxiliary information comprises service trigger conditions, and the service trigger conditions are used for the MTC terminal to perform the M2M service initiation requesting when the MTC terminal judges that service trigger conditions are satisfied.

10. The network transmission device according to claim 9, wherein the PDU data packet received from the MTC server includes the auxiliary information, and the auxiliary information includes the service trigger conditions, and the MTC terminal is notified of the auxiliary information, and the service trigger conditions included in the auxiliary information are used for the MTC terminal to perform the M2M service initiation requesting when the MTC terminal judges that service trigger conditions are satisfied.

11. The network transmission device according to claim 10, wherein the notification of the auxiliary information to the MTC terminal comprises:

sending, by the network transmission device, a paging message to the MTC terminal, wherein the paging message carries channel notification information indicating a downlink channel from which the MTC terminal is to read the auxiliary information.

12. The network transmission device according to claim 11, wherein the PDU data packet further comprises the group identity, and the sending, by the network transmission device, of the paging message to the MTC terminal comprises:

obtaining, by the network transmission device, a network group identity according to the group identity;

initiating, by the network transmission device, the paging message according to the network group identity; and sending, by the network transmission device, the paging message to the MTC terminal.

13. The network transmission device according to claim 10, wherein the service trigger conditions comprise a time window allowing service initiation and a location area allowing service initiation.

14. The network transmission device according to claim 9, wherein the notification of the indication information to the MTC terminal comprises:
   sending a paging message to the MTC terminal, wherein the paging message carries the indication information.

15. The network transmission device according to claim 14, wherein the PDU data packet further comprises the group identity; and
   the sending, by the network transmission device, a paging message to the MTC terminal comprises:
      obtaining, by the network transmission device, a network group identity according to the group identity;
      initiating, by the network transmission device, the paging message according to the network group identity; and
      sending, by the network transmission device, the paging message to the MTC terminal.

16. The method according to claim 9, wherein the service trigger conditions comprise a time window allowing service initiation and a location area allowing service initiation.

* * * * *